(12) United States Patent
Bricaud et al.

(10) Patent No.: US 6,241,545 B1
(45) Date of Patent: Jun. 5, 2001

(54) CONNECTOR SYSTEM FOR SMART CARDS

(75) Inventors: Herve' Guy Bricaud; Fabrice Valcher, both of Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/438,858

(22) Filed: Nov. 12, 1999

Related U.S. Application Data

(63) Continuation-in-part of application No. PCT/FR98/00933, filed on May 11, 1998.

(30) Foreign Application Priority Data

May 13, 1997 (FR) .................................................. 97 05809

(51) Int. Cl.[7] .................................................. H01R 13/62
(52) U.S. Cl. .......................................... 439/326; 439/331
(58) Field of Search ................................... 439/326, 325, 439/331, 296, 330, 328, 329

(56) References Cited

U.S. PATENT DOCUMENTS

| | | | |
|---|---|---|---|
| 5,320,552 | * | 6/1994 | Reichardt et al. .................. 439/331 |
| 5,603,629 | * | 2/1997 | DeFrasne et al. .................. 439/331 |
| 5,813,878 | * | 9/1998 | Kuwata et al. ..................... 439/326 |
| 6,053,775 | * | 4/2000 | Ungermann et al. ............... 439/630 |
| 6,106,317 | * | 8/2000 | Michaelis et al. .................. 439/326 |
| 6,149,450 | * | 2/1997 | Gastineau ........................... 439/325 |
| 6,149,466 | * | 11/2000 | Bricaud et al. ..................... 439/630 |

* cited by examiner

*Primary Examiner*—Lincoln Donovan
*Assistant Examiner*—Eugene G. Byrd
(74) *Attorney, Agent, or Firm*—Roger C. Turner

(57) ABSTRACT

An electrical connector system includes plate-shaped bases (50) that lie on a circuit board (38) and that have contacts (52) with contact tails (58) soldered to traces on the circuit board. A housing (300) that lies on the circuit board around the bases, is coupled to each of the bases to accurately locate the housing with respect to the bases, the housing having a plurality of guides (164) for receiving smart cards that can engage contacting parts of the contacts on the bases. The housing includes a frame (90) that is fixed with respect to the circuit board and bases, and a cover (92) having a rear end pivotally mounted about a lateral axis X-X on the frame and forming the guides for holding the smart cards, so the smart cards can pivot down against the contacts on the bases. The cover can be locked down by a latch (94) formed of a piece of sheet metal that slides on the cover and that has downwardly-extending tabs (228) that fit under slots on a front beam of the frame.

21 Claims, 23 Drawing Sheets

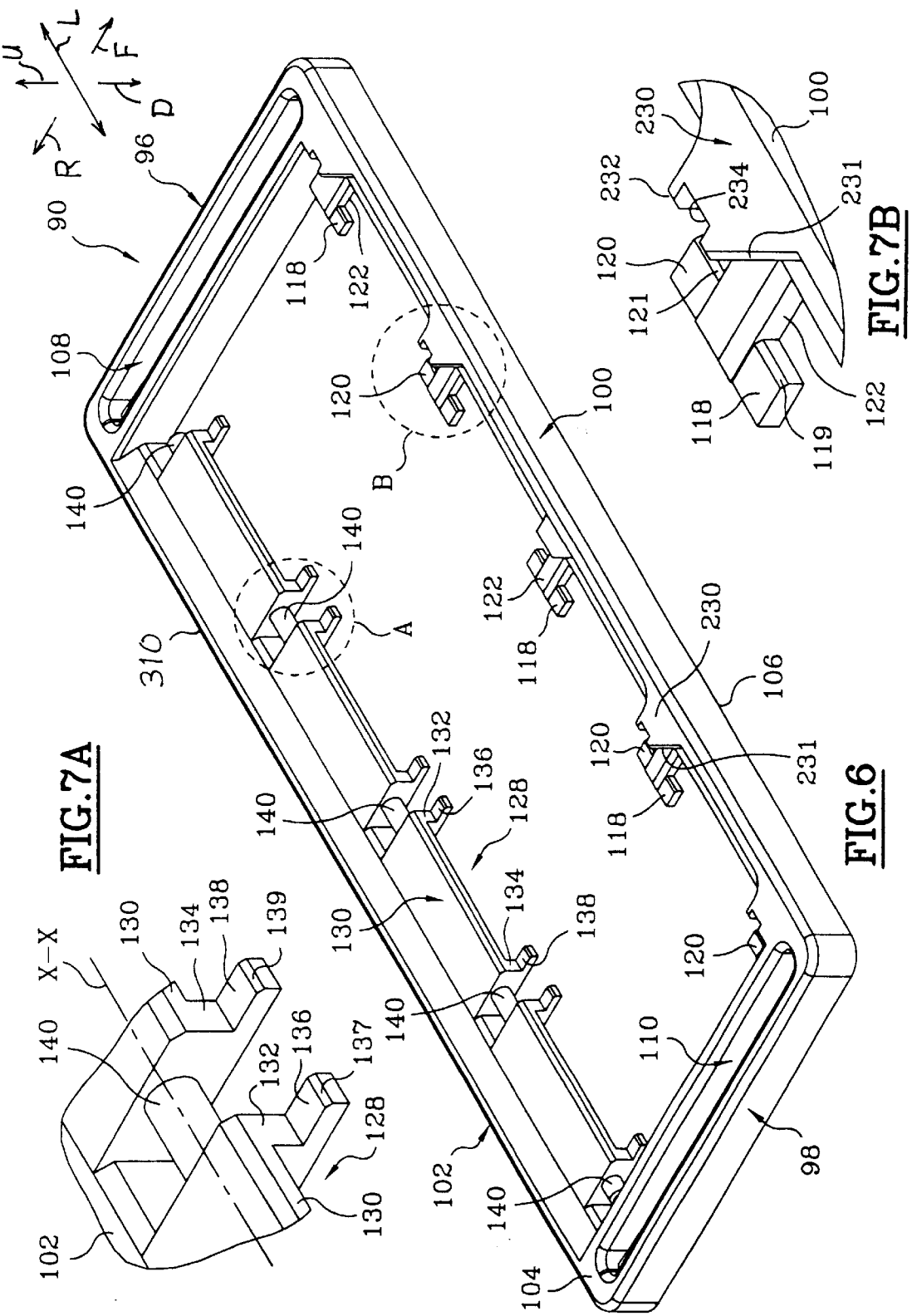

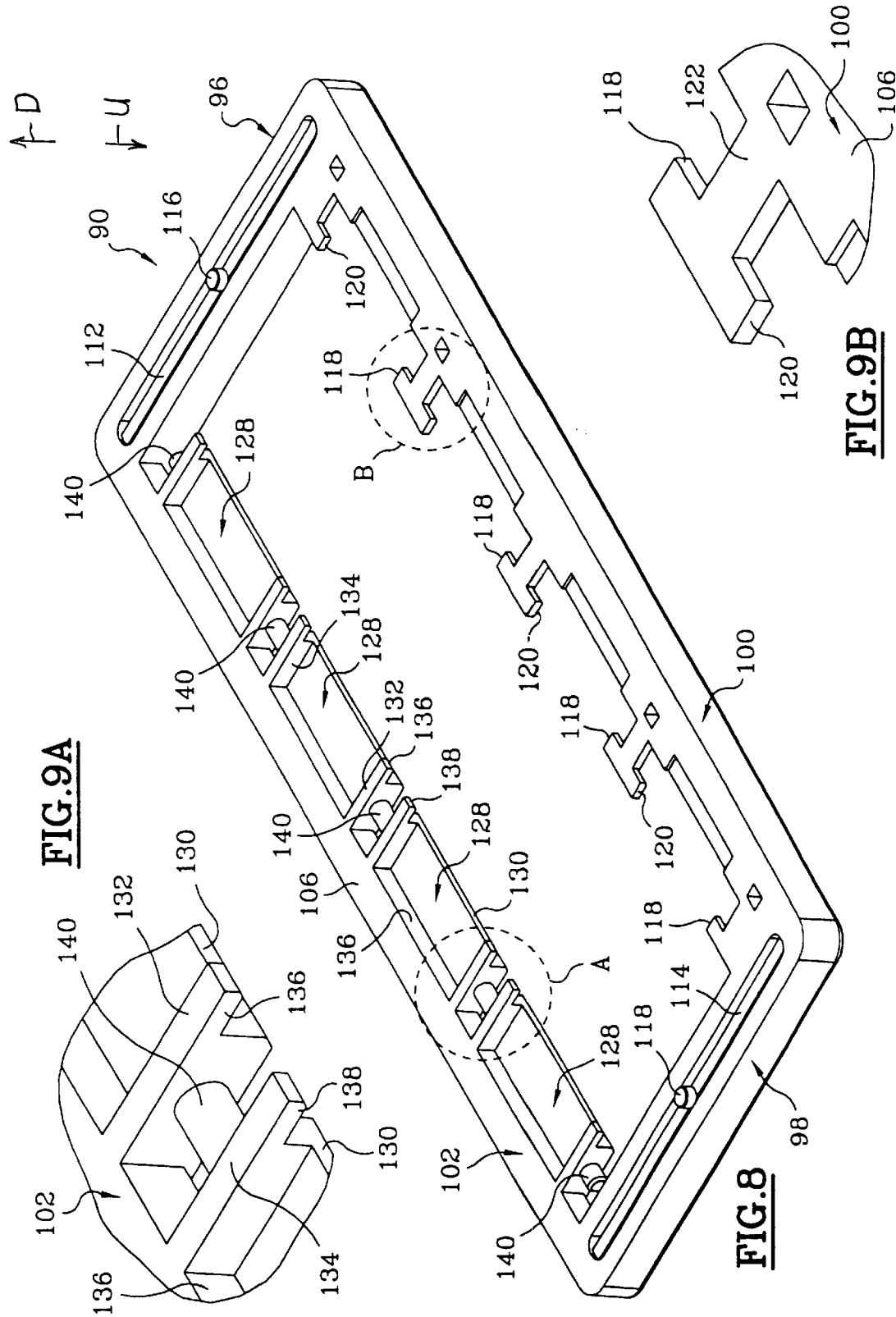

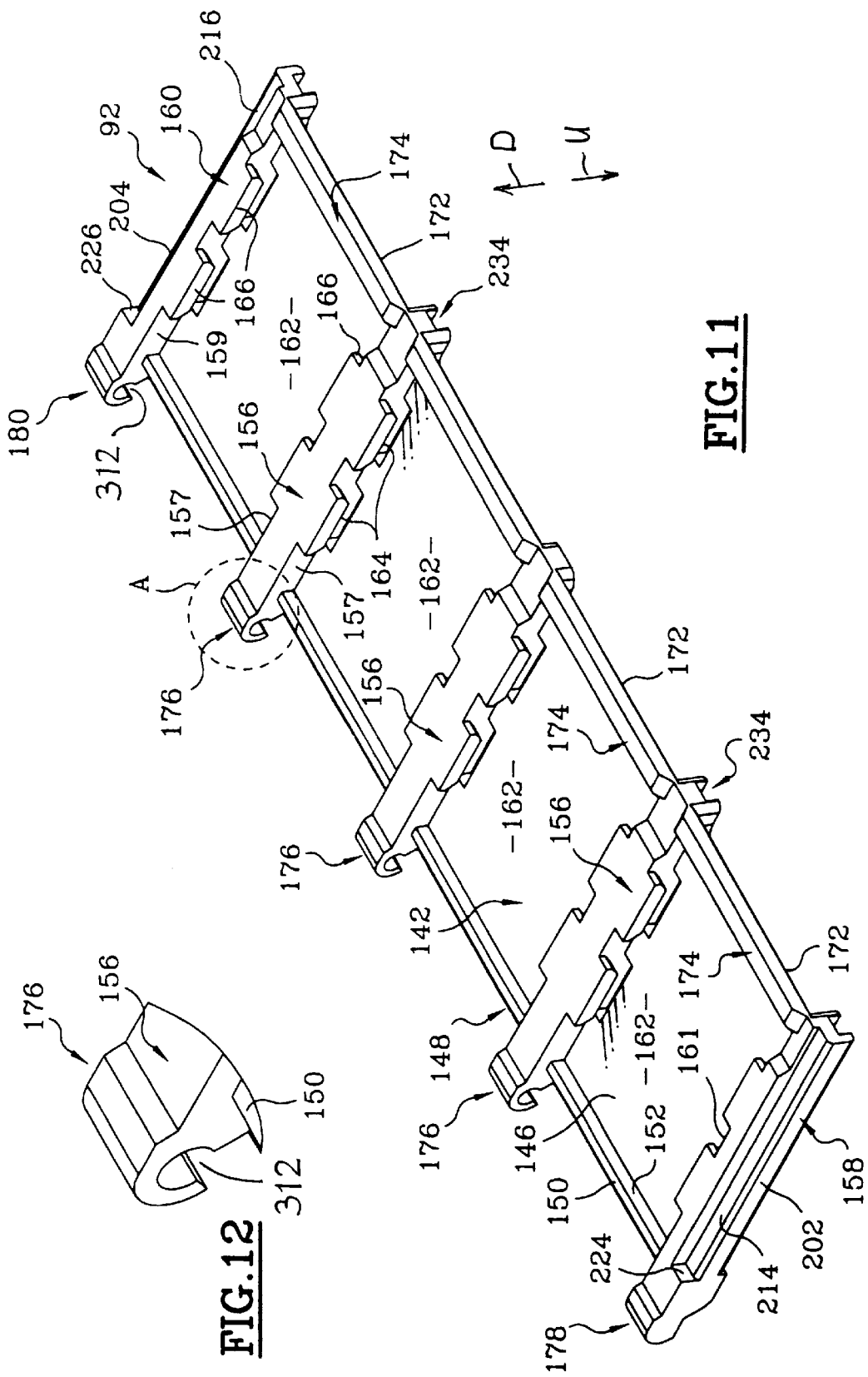

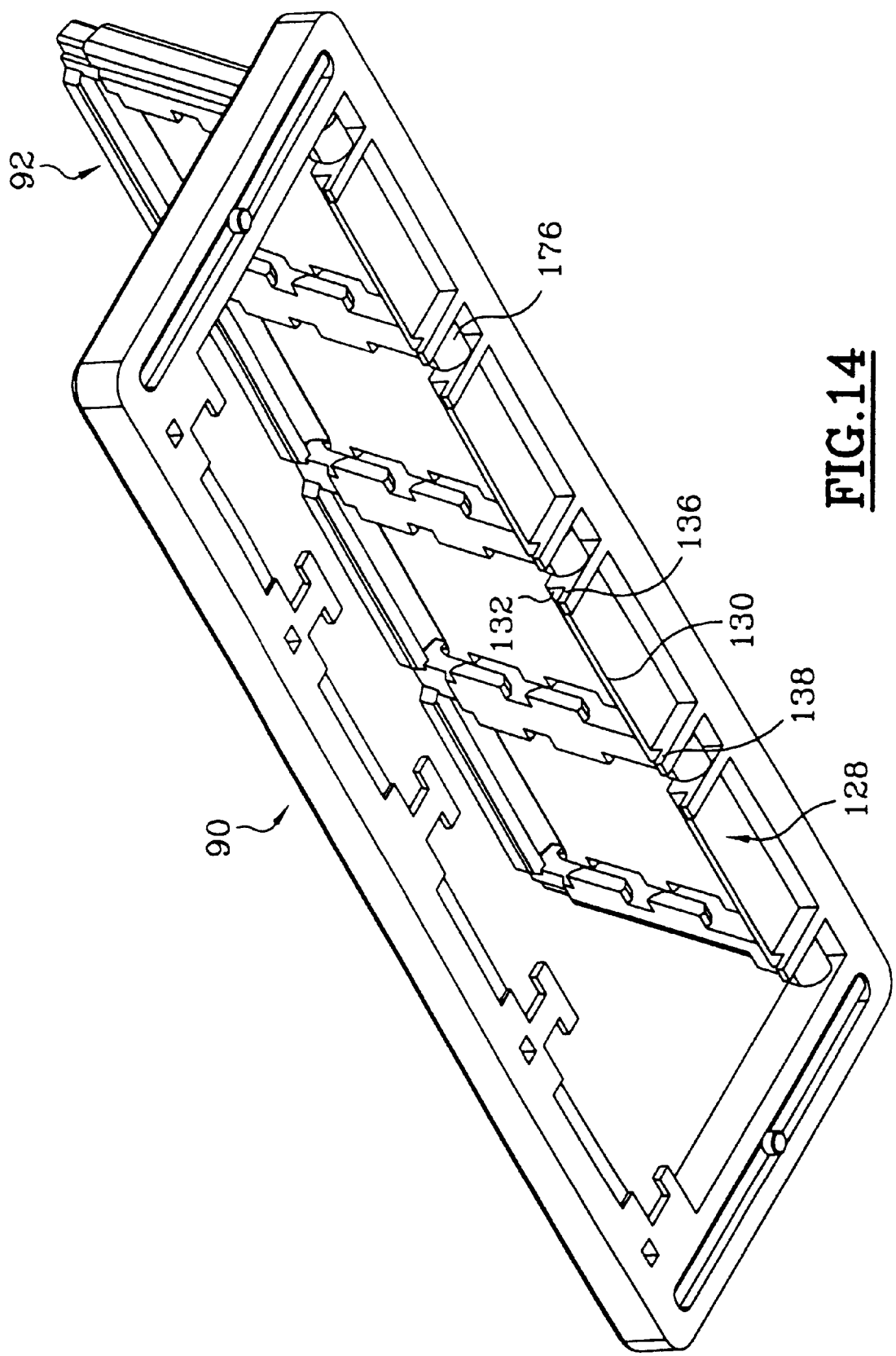

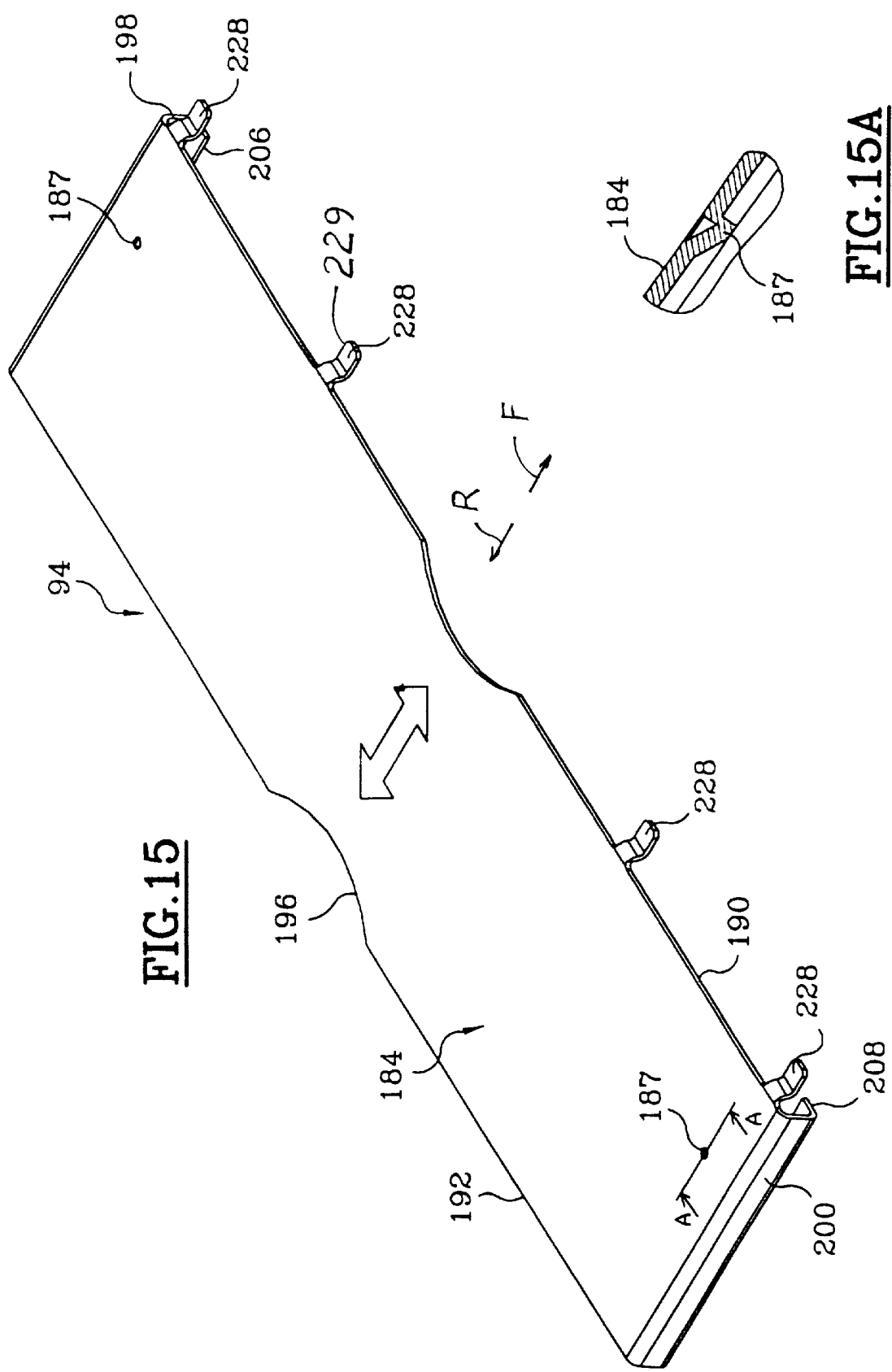

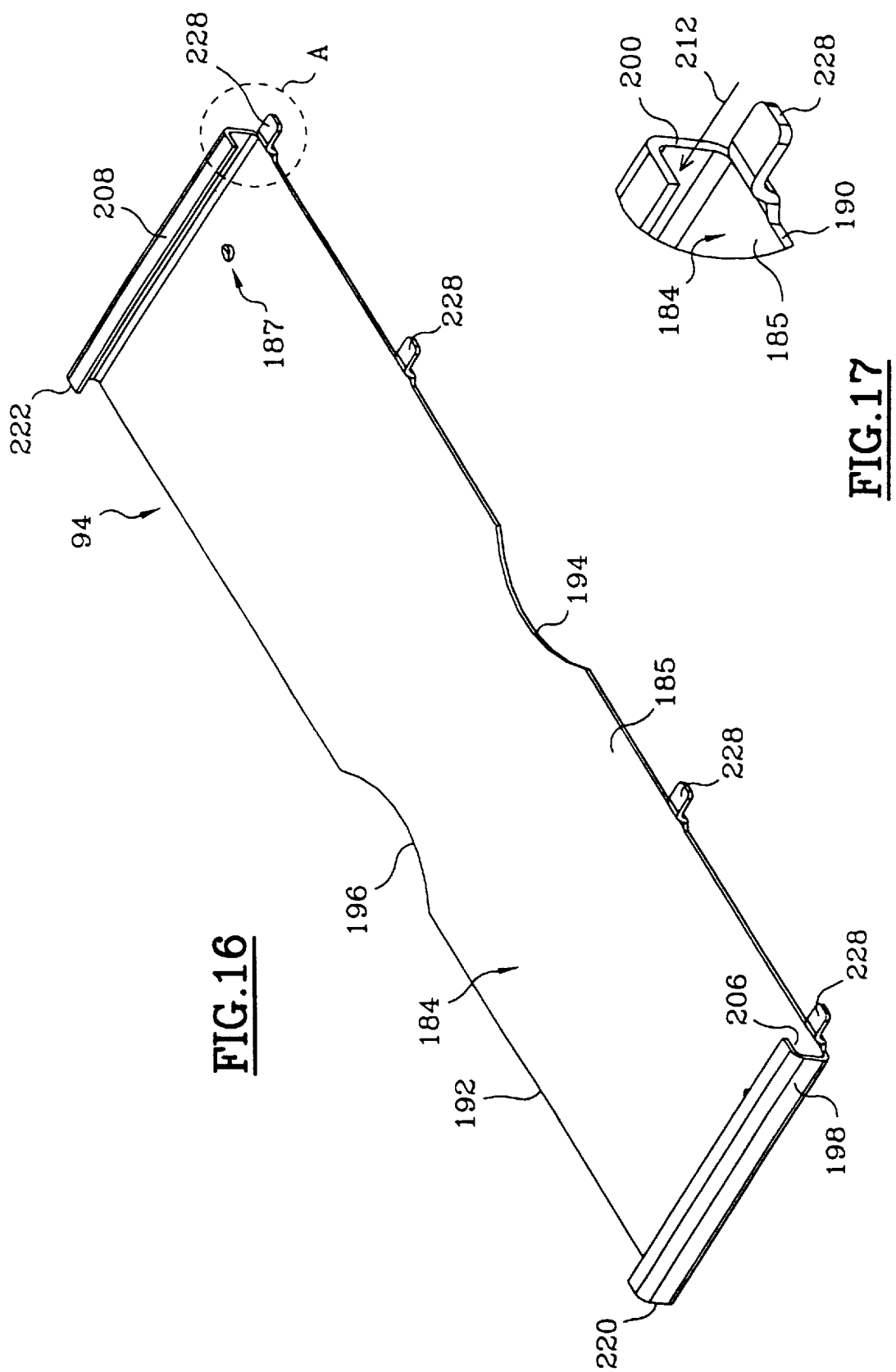

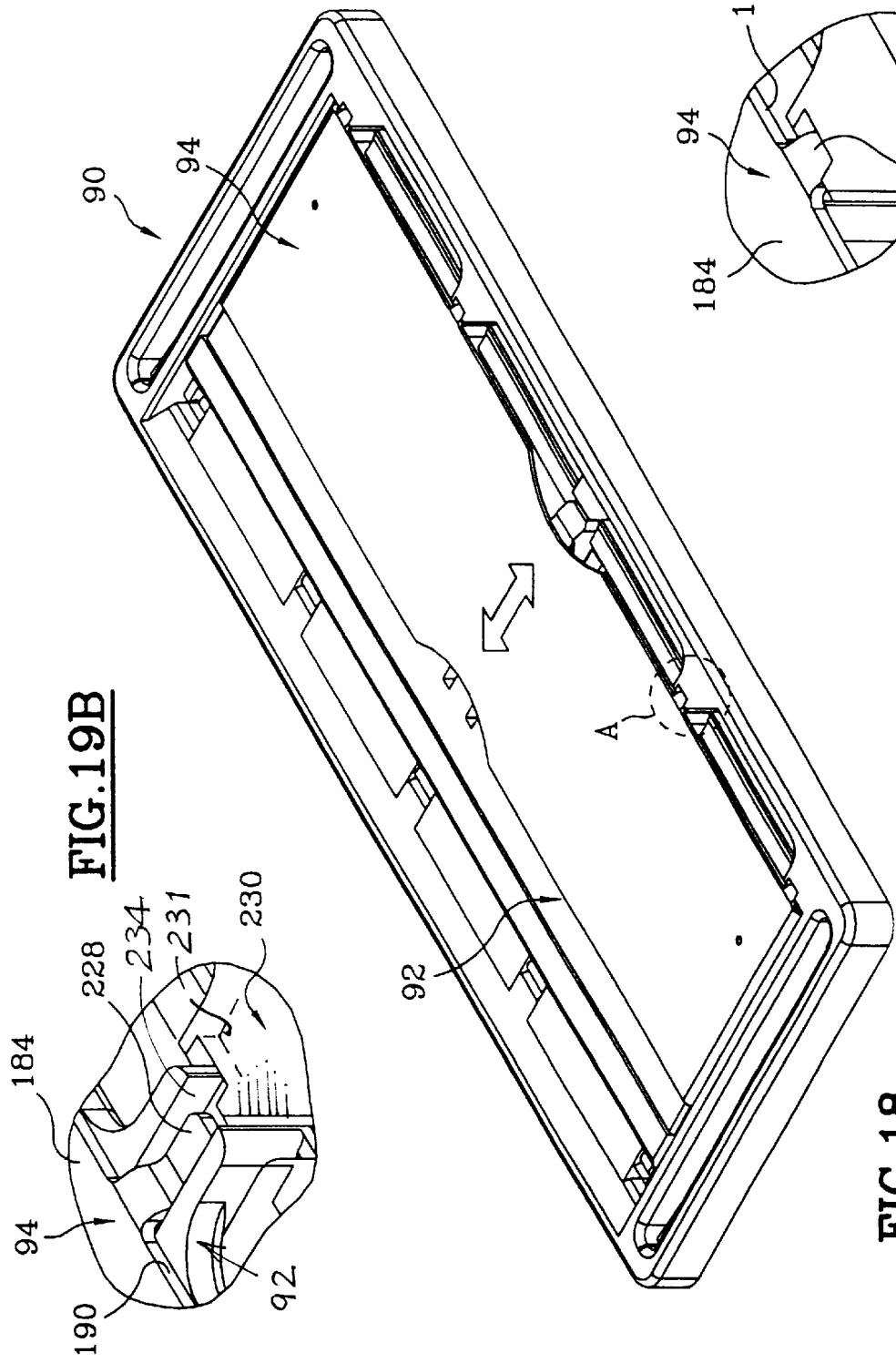
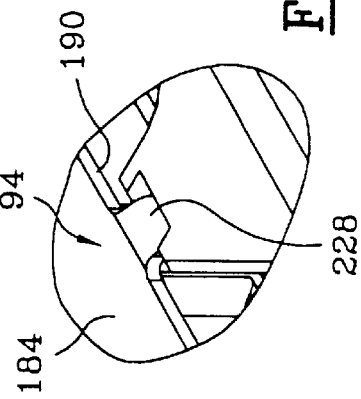
FIG. 18
FIG. 19A
FIG. 19B

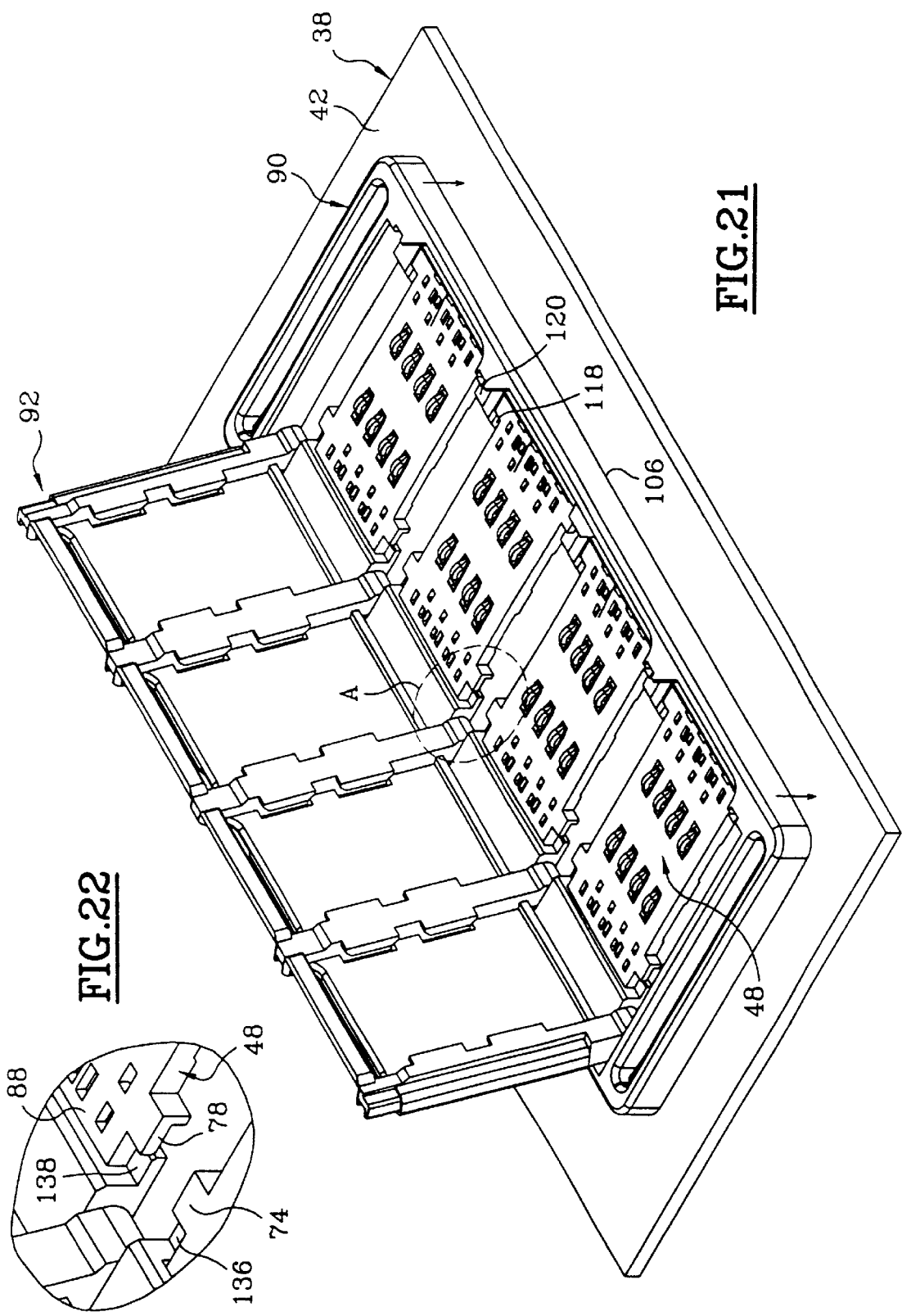

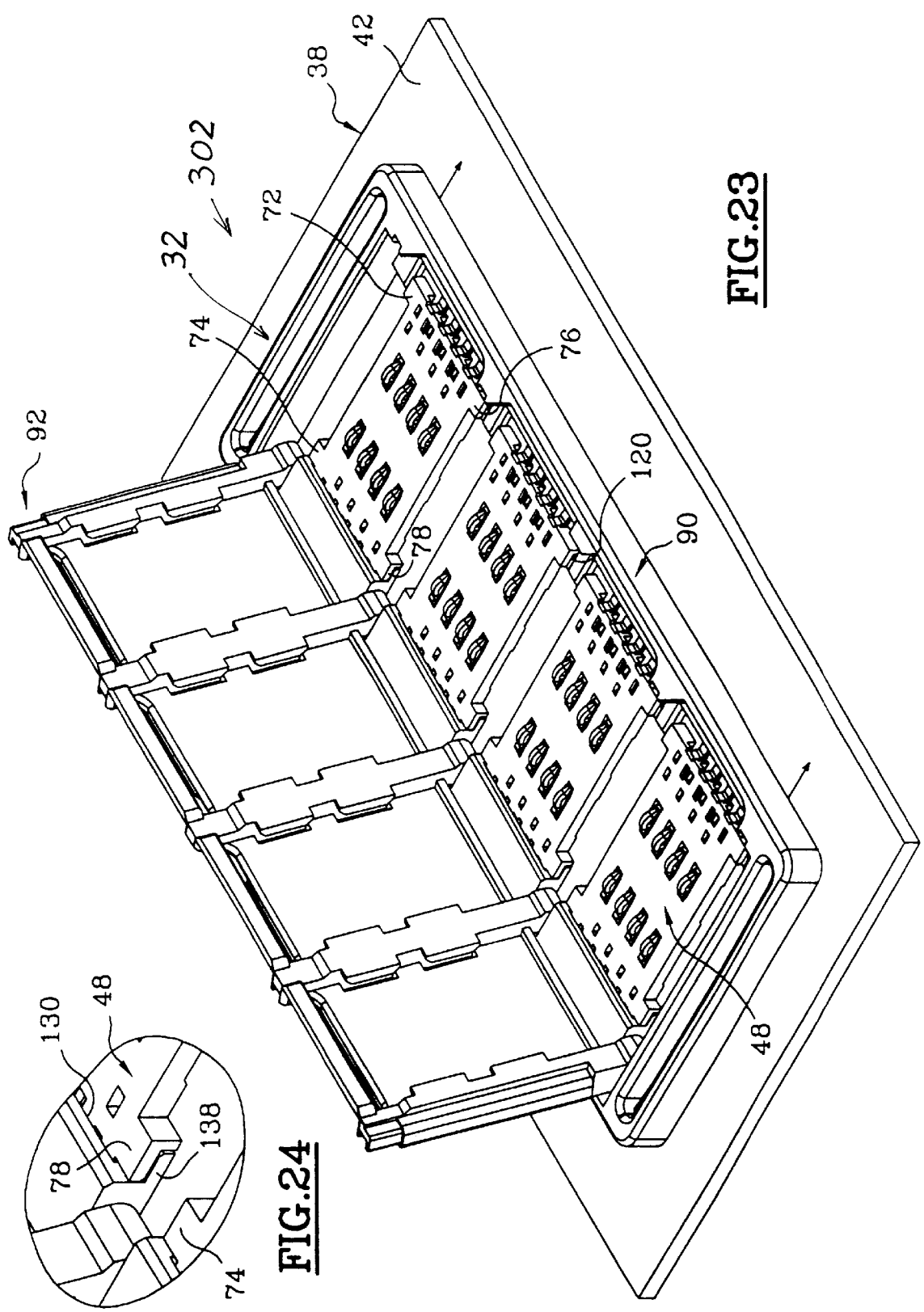

CONNECTOR SYSTEM FOR SMART CARDS

CROSS-REFERENCE

This is a continuation-in-part of PCT application PCT/FR98/00933 filed May 11, 1998 which claims priority from French application SN. 97/05809 filed May 13, 1997.

BACKGROUND OF THE INVENTION

Smart cards include a thin plate of plastic with an integrated circuit chip embedded therein and connected to contact pads on the surface of the card. Smart cards come in different sizes, with a chip card having a width and length of about two or three centimeters and a thickness of less than one millimeter. Such chip cards are often used by shopkeepers to identify themselves in banking or payment networks. An authorized connection to each network requires an electrical connector for connecting a card to that specific network. It would be desirable if a plurality of chip cards could each be connected to a different selected network in a connector arrangement of relatively simple design and moderate cost.

BRIEF DESCRIPTION OF THE DRAWINGS

In accordance with one embodiment of the present invention, an electrical connector is provided that has a minimum number of parts and that enables the connection of a plurality of smart cards to selected networks. The connector includes a circuit board, a plurality of laterally-spaced bases lying on the circuit board and carrying contacts, and a housing that is mounted on the circuit board around the bases and that has a plurality of guides that each can be receive a smart card. The circuit board has a plurality of groups of traces and the contacts on each base have tails soldered to the circuit board traces. The housing is engaged with the bases to precisely fix the position of the housing with respect to the bases and their contacts, so smart cards fully inserted into guides of the housing will engage contacting parts of the contacts.

The housing includes a frame fixed to the circuit board and to the bases, and a cover having a rear end pivotally mounted about a lateral axis on the frame and carrying the guides that receive the cards. When the cover is pivoted up, the smart cards can be inserted into the cover, and the cover then can be pivoted down to press the pads on the smart cards against the contacts.

Each base has slot walls forming slots between the slot wall and the circuit board. The frame includes lugs that slide between the slot walls and the circuit board to hold down the frame to the circuit board. Each frame also has downwardly-extending studs that project into holes in the circuit board to fix the horizontal position of the frame. A sheet metal latch is slidably mounted on the cover to slide forward and rearward between lock and unlock positions, respectively. A front edge of the sheet metal has at least one downwardly bent tab that can slide under a slot wall at the front of the frame to hold the cover it in its closed position.

The frame and cover are each one-piece molded plastic parts. One of them has a plurality of laterally-spaced pin portions spaced along the pivot axis, and the other has a plurality of bearings that each has a slot to allow the bearing to snap around a corresponding pin portion.

The novel features of the invention are set forth with particularity in the appended claims. The invention will be best understood from the following description when read in conjunction with the accompanying drawings.

BRIEF DESCRIPTION OF THE DRAWINGS

Figure 1:
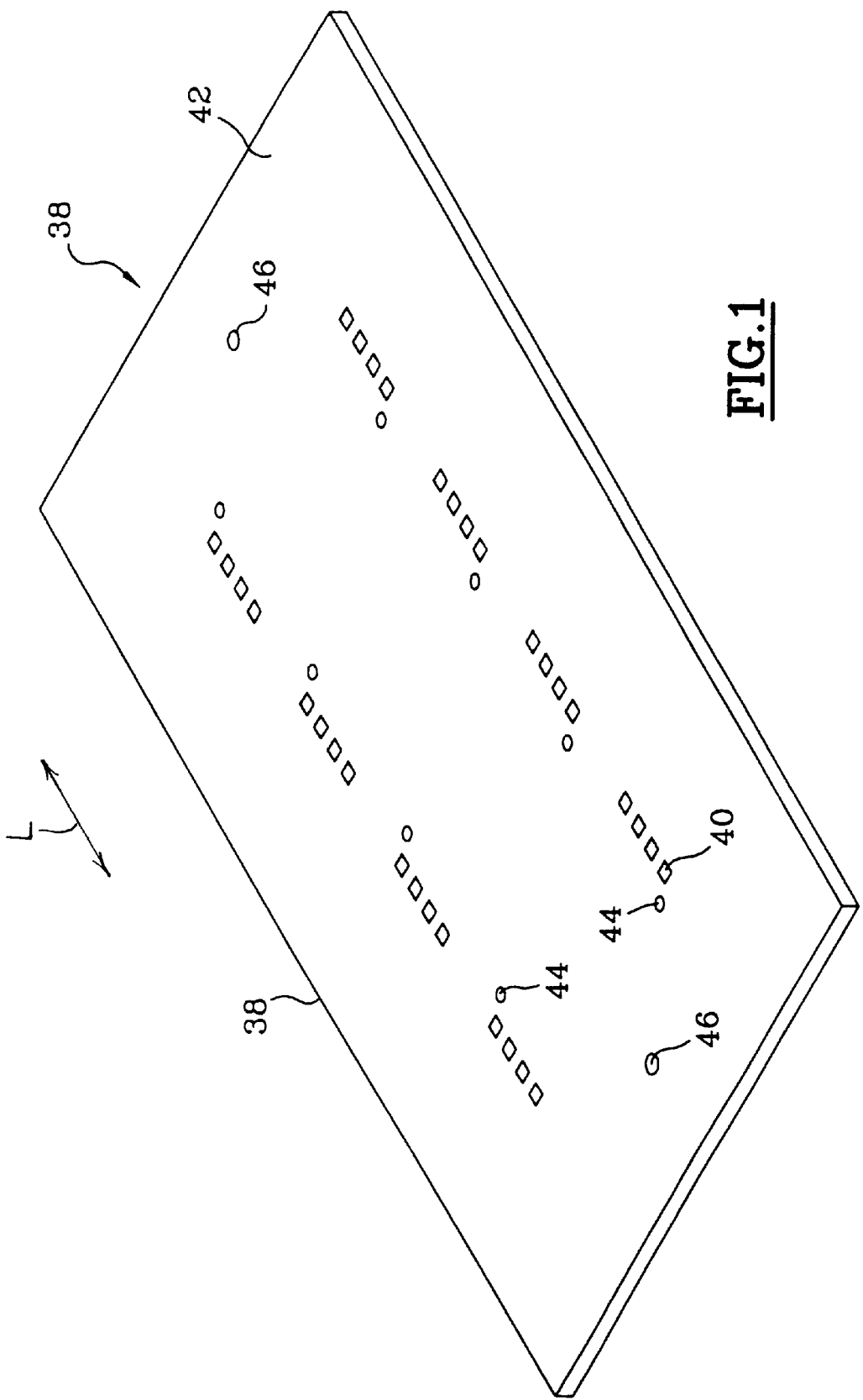

FIG. 1 is a top and front isometric view of a circuit board of a connector system of the invention.

Figure 2:
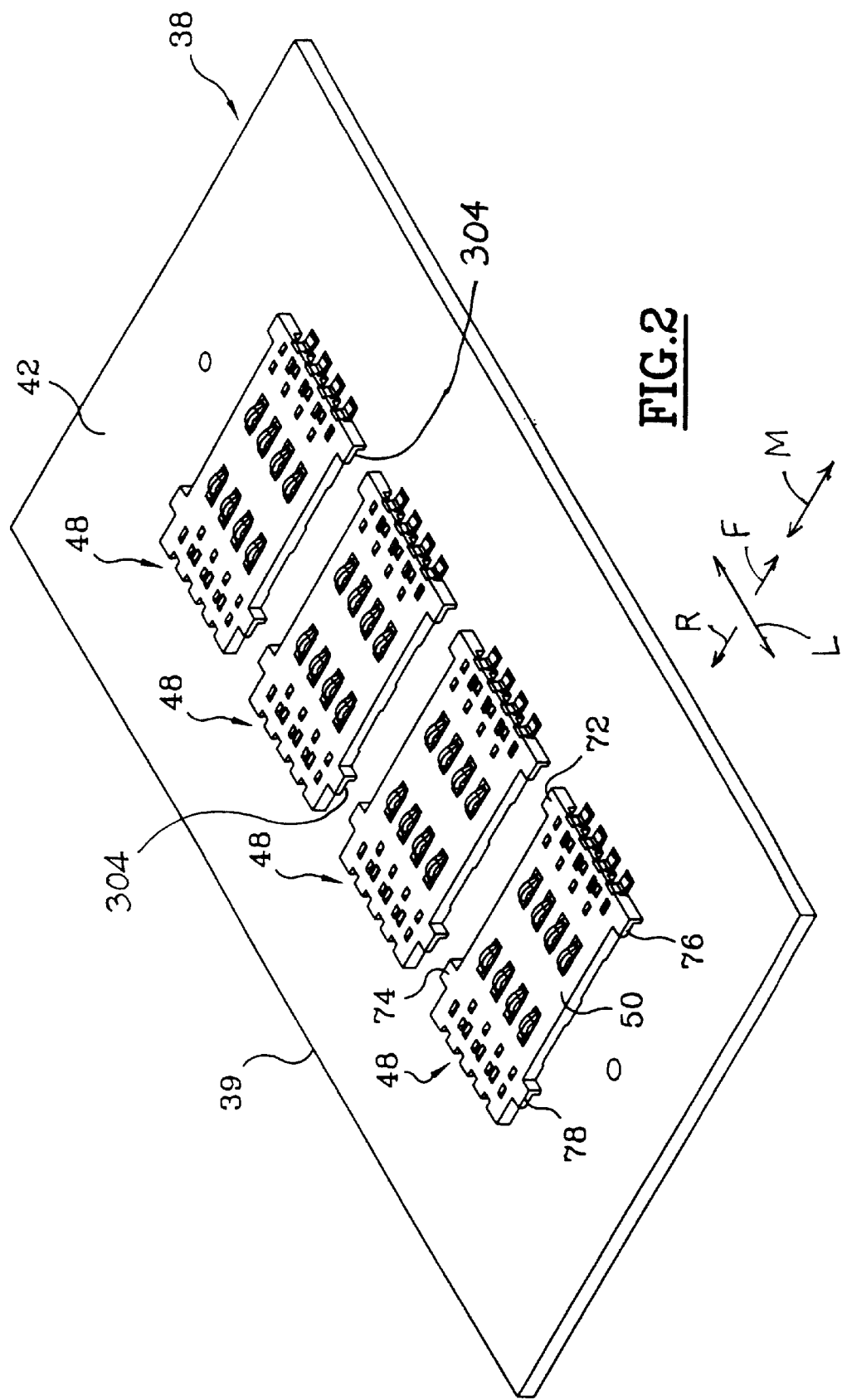

FIG. 2 is a top and front isometric view of the circuit board of FIG. 1 with four contact-carrying bases thereon.

Figure 3:
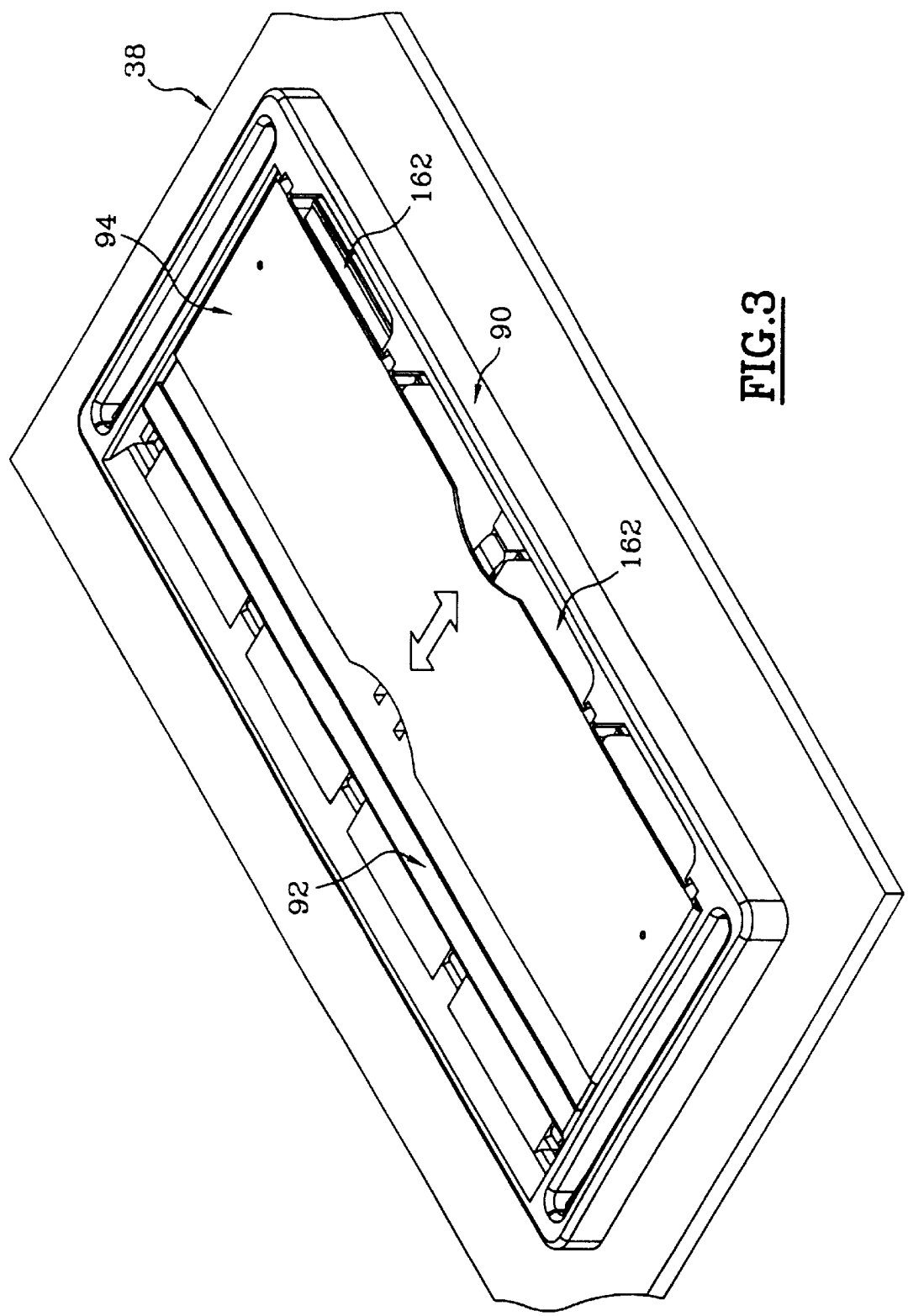

FIG. 3 is a front and top isometric view of a complete connector, in a closed position and with three smart cards therein.

Figure 4:
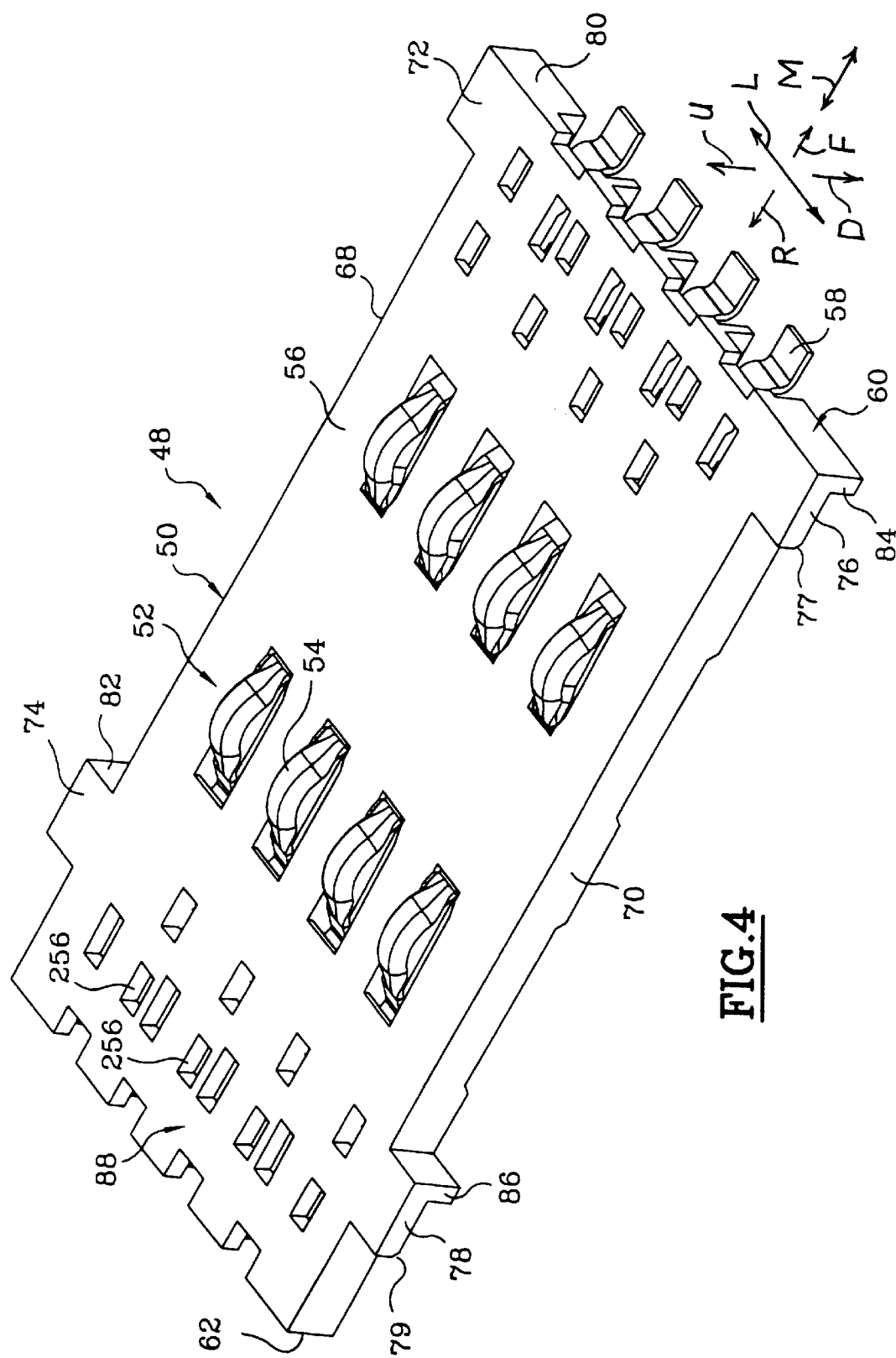

FIG. 4 is a top isometric view of one of the bases of the connector of FIG. 2.

Figure 5:
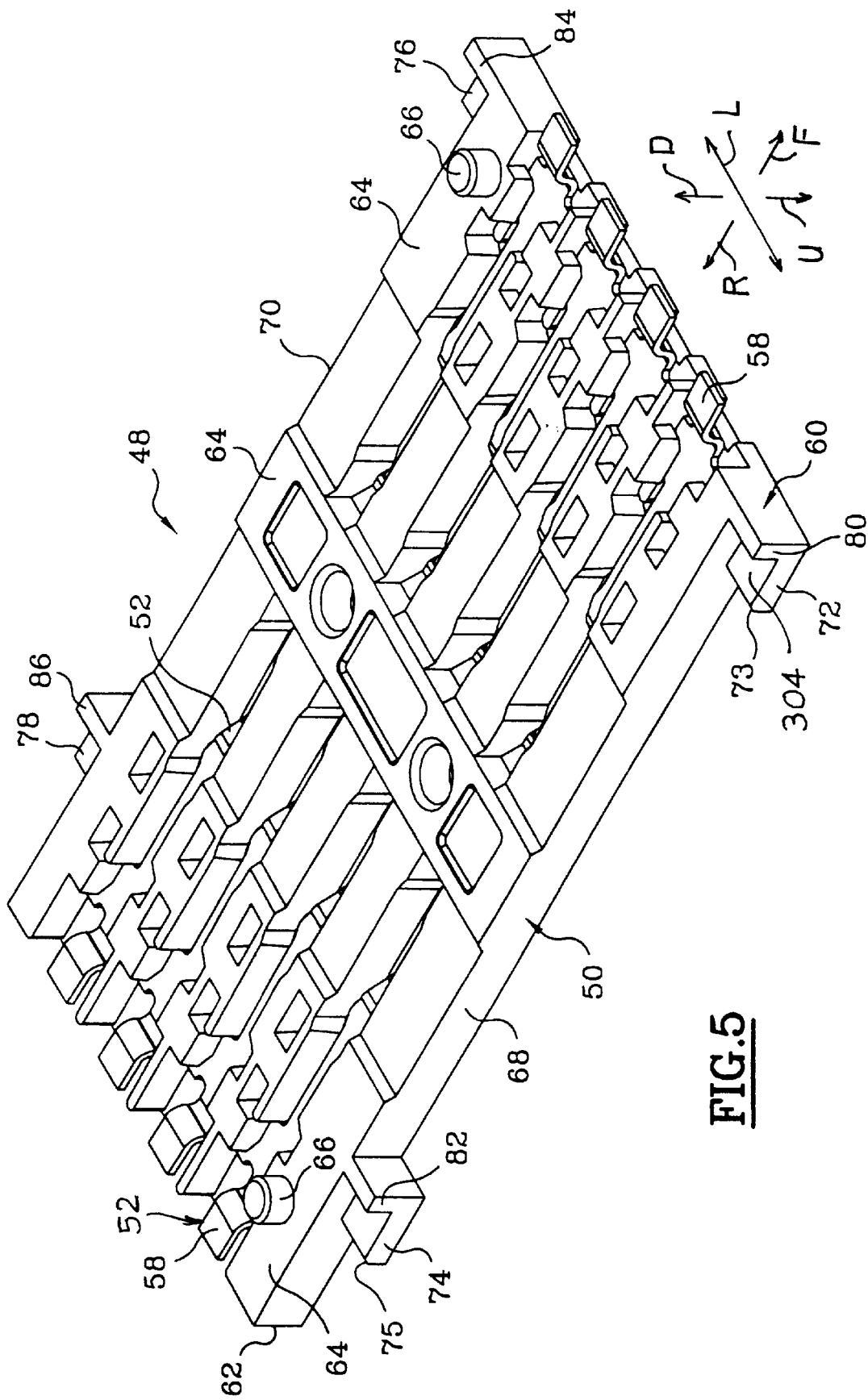

FIG. 5 is a bottom isometric view of the base of FIG. 4.

FIG. 6 is a top isometric view of a frame of the connector of FIG. 3.

FIG. 7A is an enlarged view of area A of FIG. 6.

FIG. 7B is an enlarged view of area B of FIG. 6.

FIG. 8 is an isometric bottom view of the frame of FIG. 6.

FIGS. 9A and 9B are enlarged views of details A and B, respectively, of FIG. 8.

Figure 10:
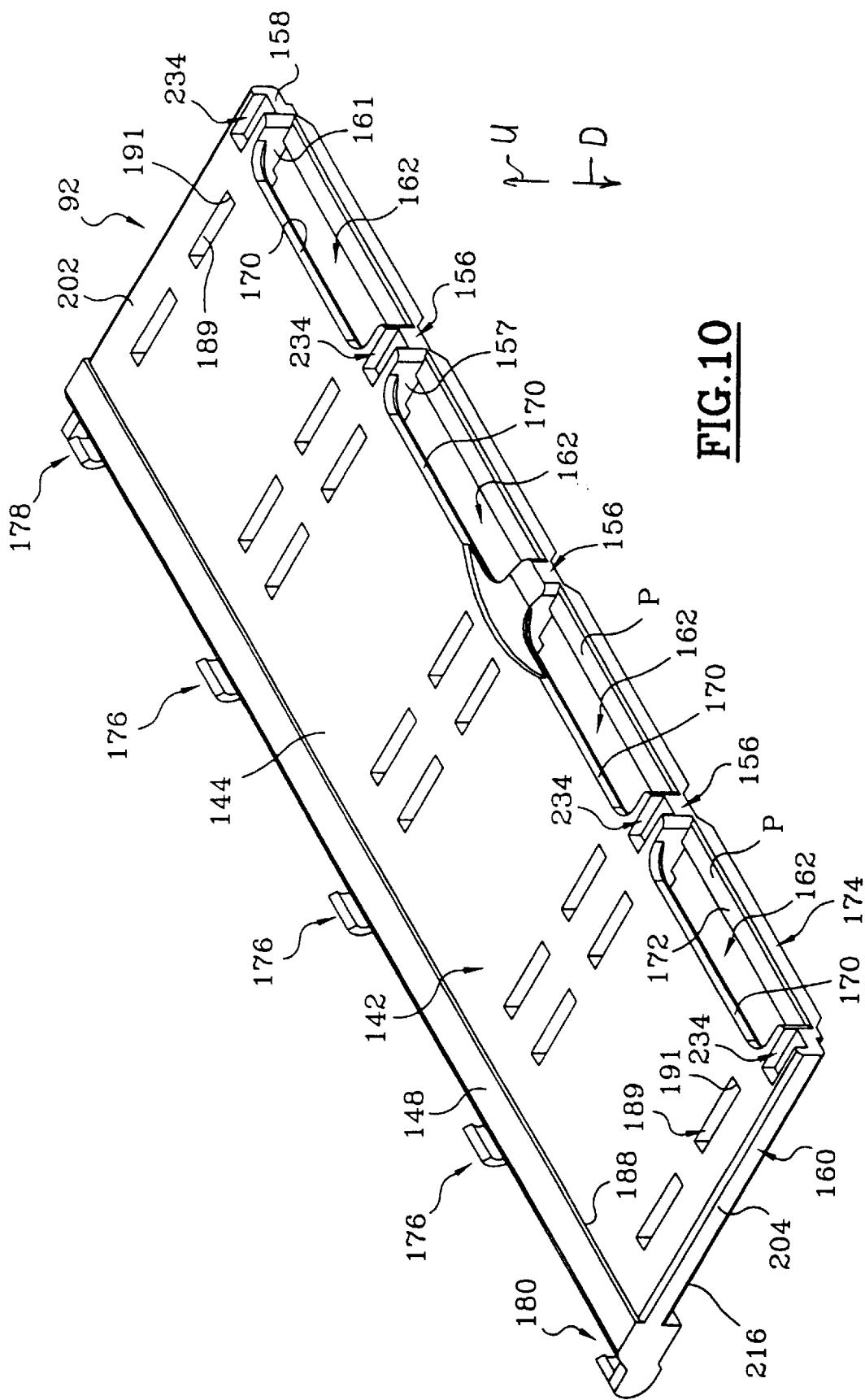

FIG. 10 is an isometric top view of the cover of the connector of FIG. 3, without the latch.

FIG. 11 is an isometric bottom view of the cover of FIG. 10.

FIG. 12 is an enlarged view of area A of FIG. 11.

Figure 13:
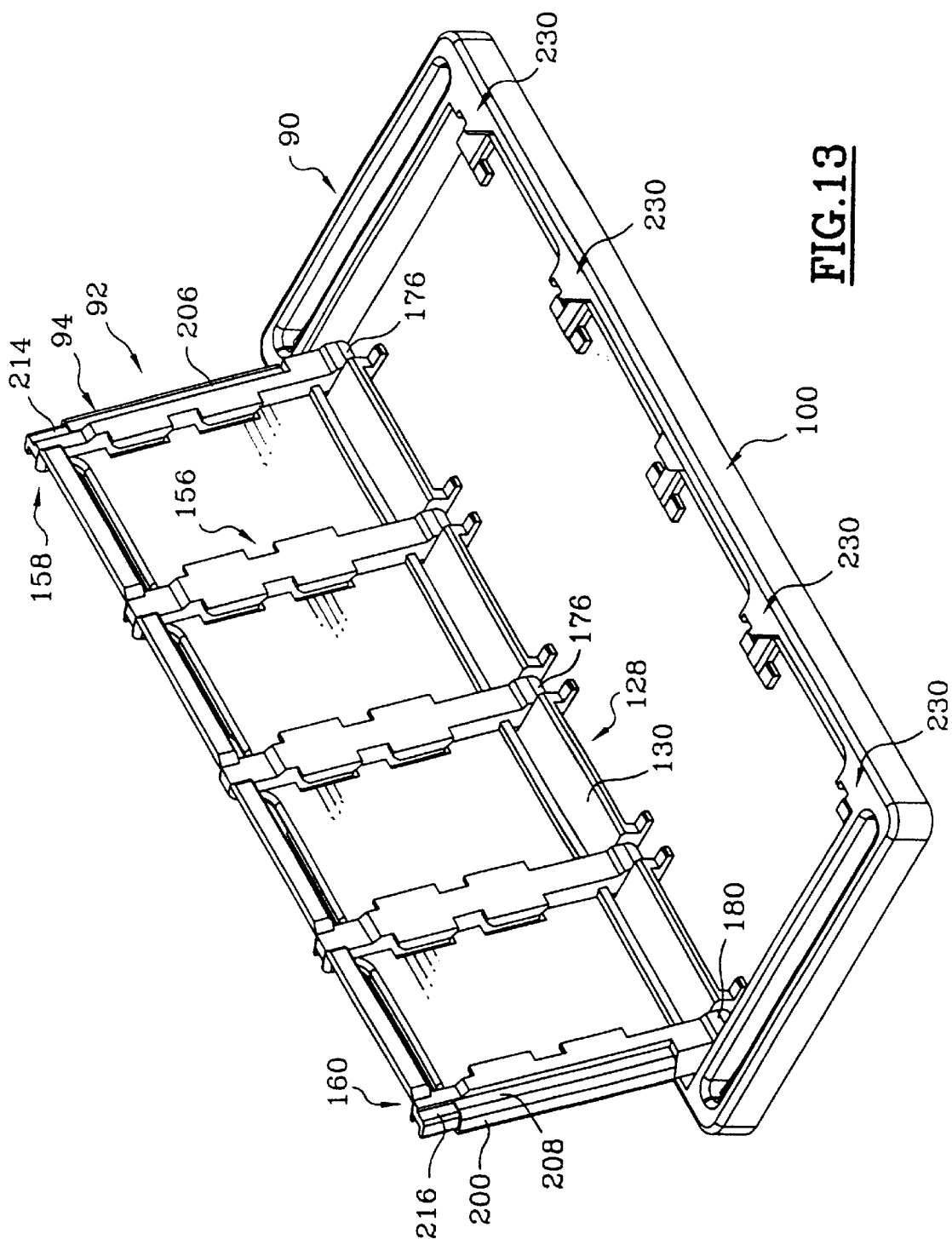

FIG. 13 is an isometric top view of the cover and frame of FIG. 3, in a fully opened position of the cover.

FIG. 14 is an isometric bottom view of the cover and frame of FIG. 13.

FIG. 15 is a top isometric view of a latch of the connector of FIG. 3.

FIG. 15A is a view taken on line A—A of FIG. 15.

FIG. 16 is a bottom isometric view of the latch of FIG. 15.

FIG. 17 is an enlarged view of area A of FIG. 16.

FIG. 18 is an isometric top view of the frame, cover, and latch, in the closed and locked position of the cover and latch.

FIG. 19A is an enlarged view of area A of FIG. 18.

FIG. 19B is a view similar to that of FIG. 19A, but with the latch member in its unlocked position.

Figure 20:
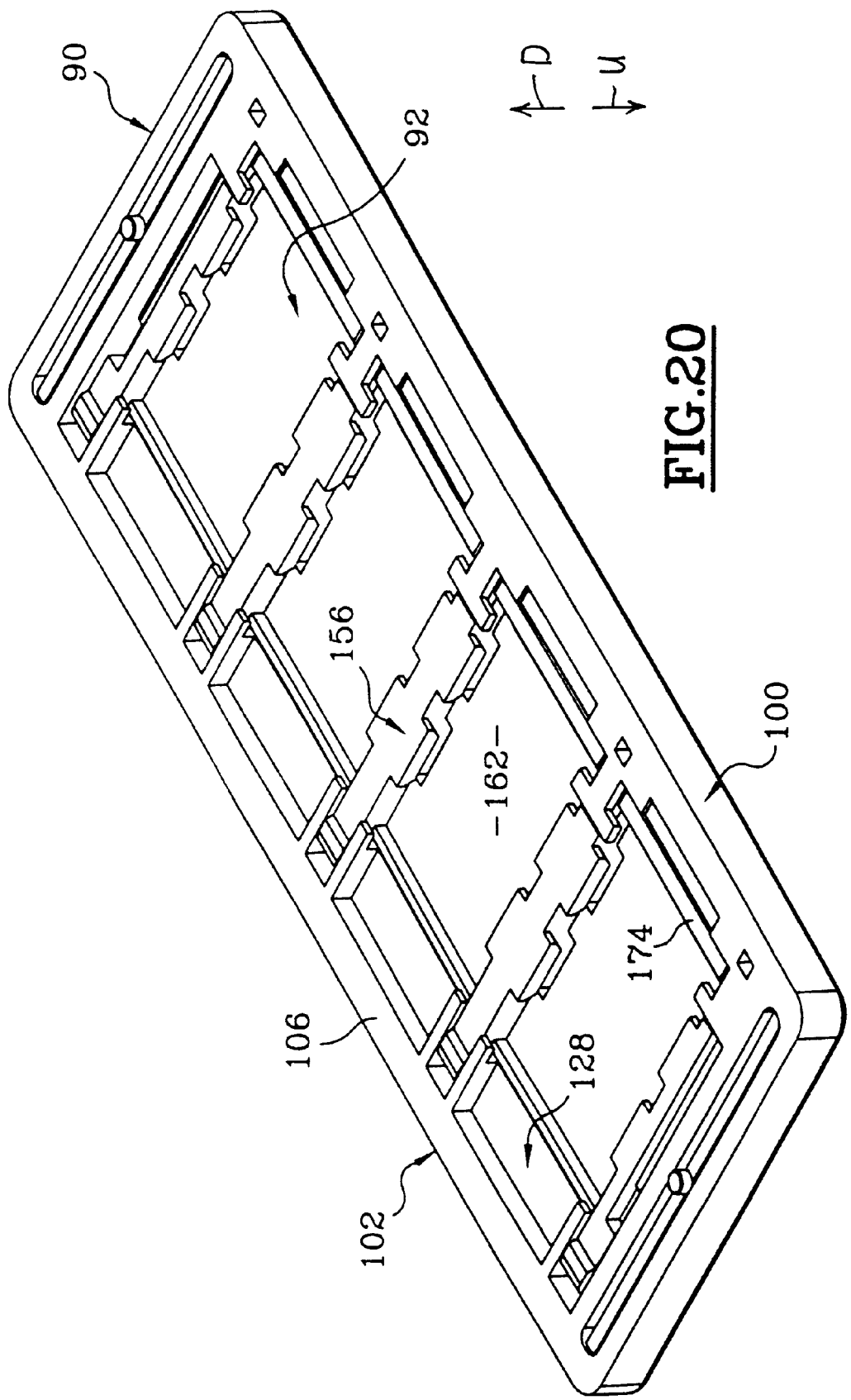

FIG. 20 is a bottom isometric view of the frame of FIG. 18.

FIG. 21 is a top isometric view of the complete connector not yet mounted on a circuit board, without cards therein, showing a first step in the mounting and fixing of the assembly of FIG. 13 to the assembly of FIG. 2.

FIG. 22 is an enlarged view of area A of FIG. 21.

FIGS. 23 and 24 are views similar to those of FIGS. 21 and 22, showing a second step in the mounting and fixing which follows the step of FIGS. 21 and 22.

Figure 25:
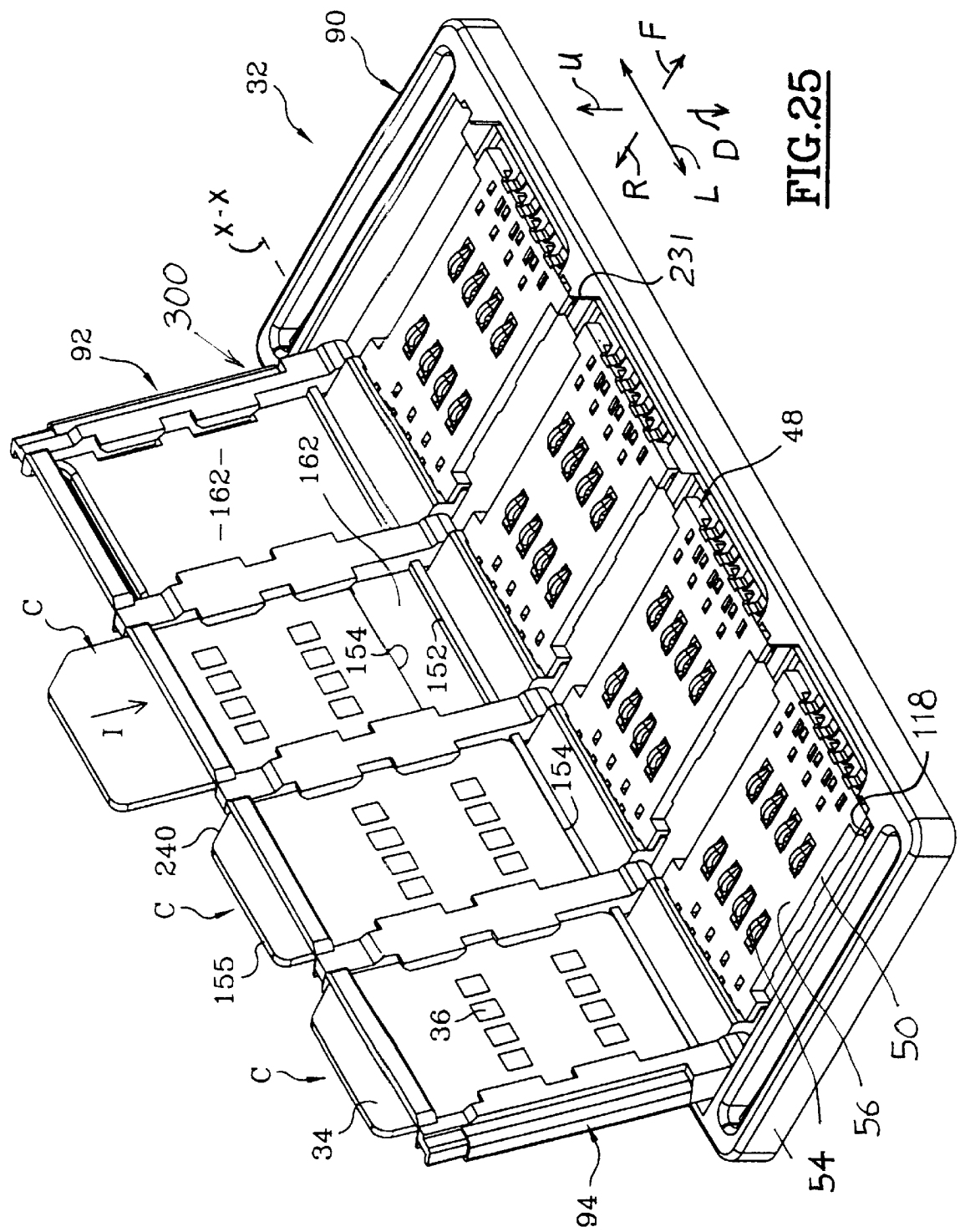

FIG. 25 is a top isometric view which shows the fully assembled connector, but without the circuit board, with the cover in its fully opened position, with two cards fully inserted, and with a third card partially inserted.

Figure 26:
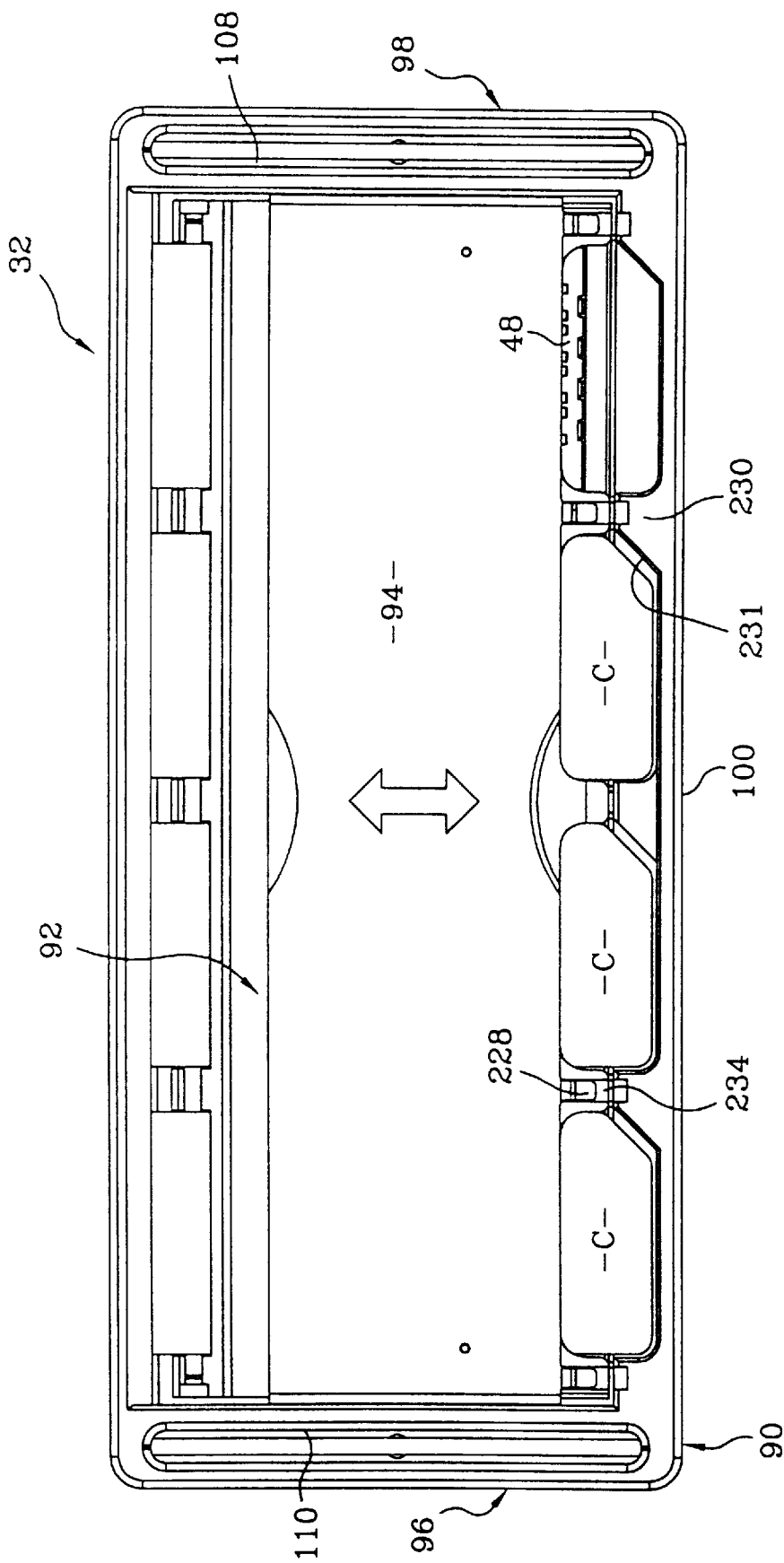

FIG. 26 is a top view of the connector of FIG. 25 with the cover in the closed position but with the latch in an unlocked position.

Figure 27:
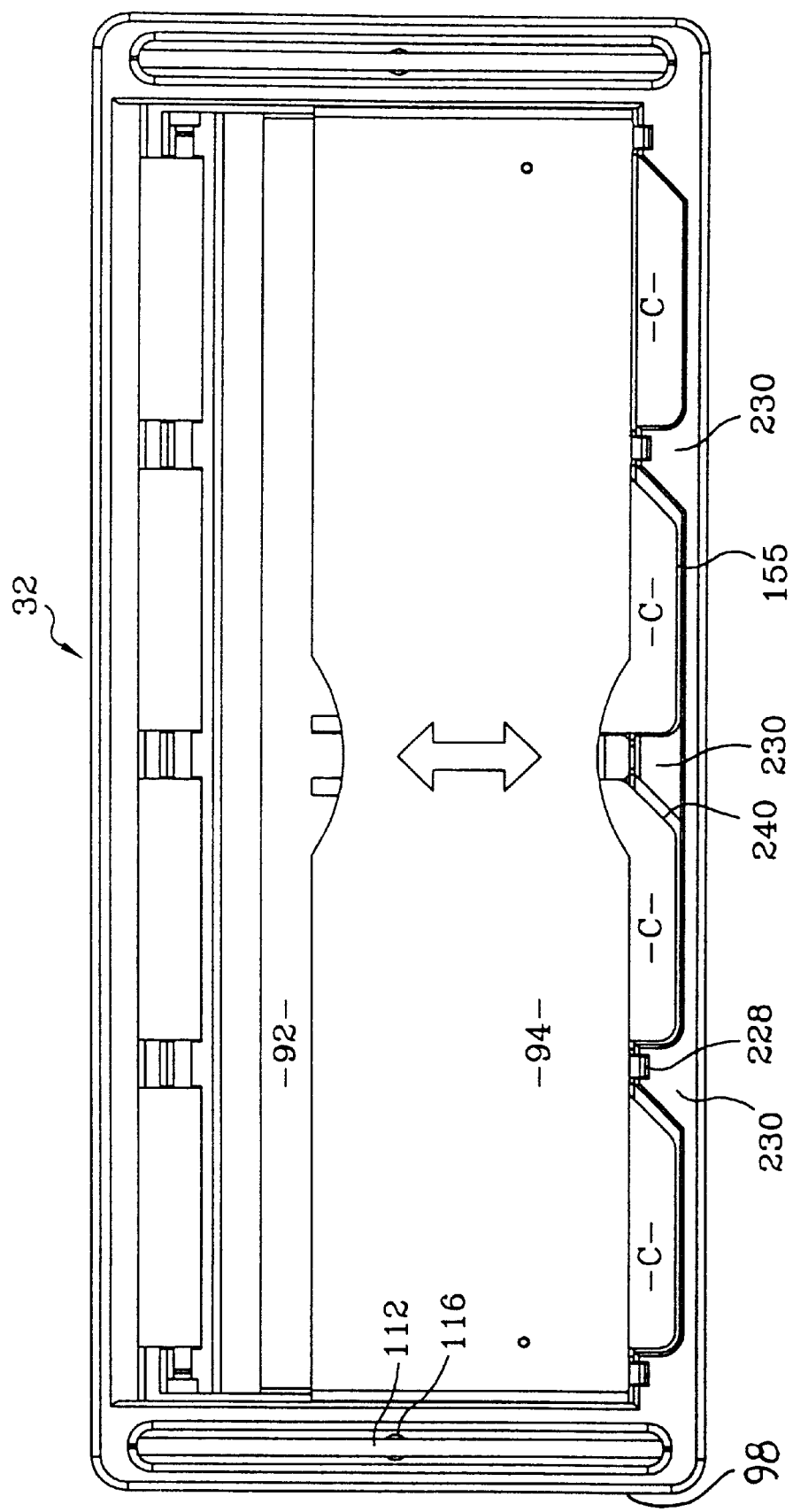

FIG. 27 is a view similar to that of FIG. 26, but with the latch in its locked position.

Figure 28:
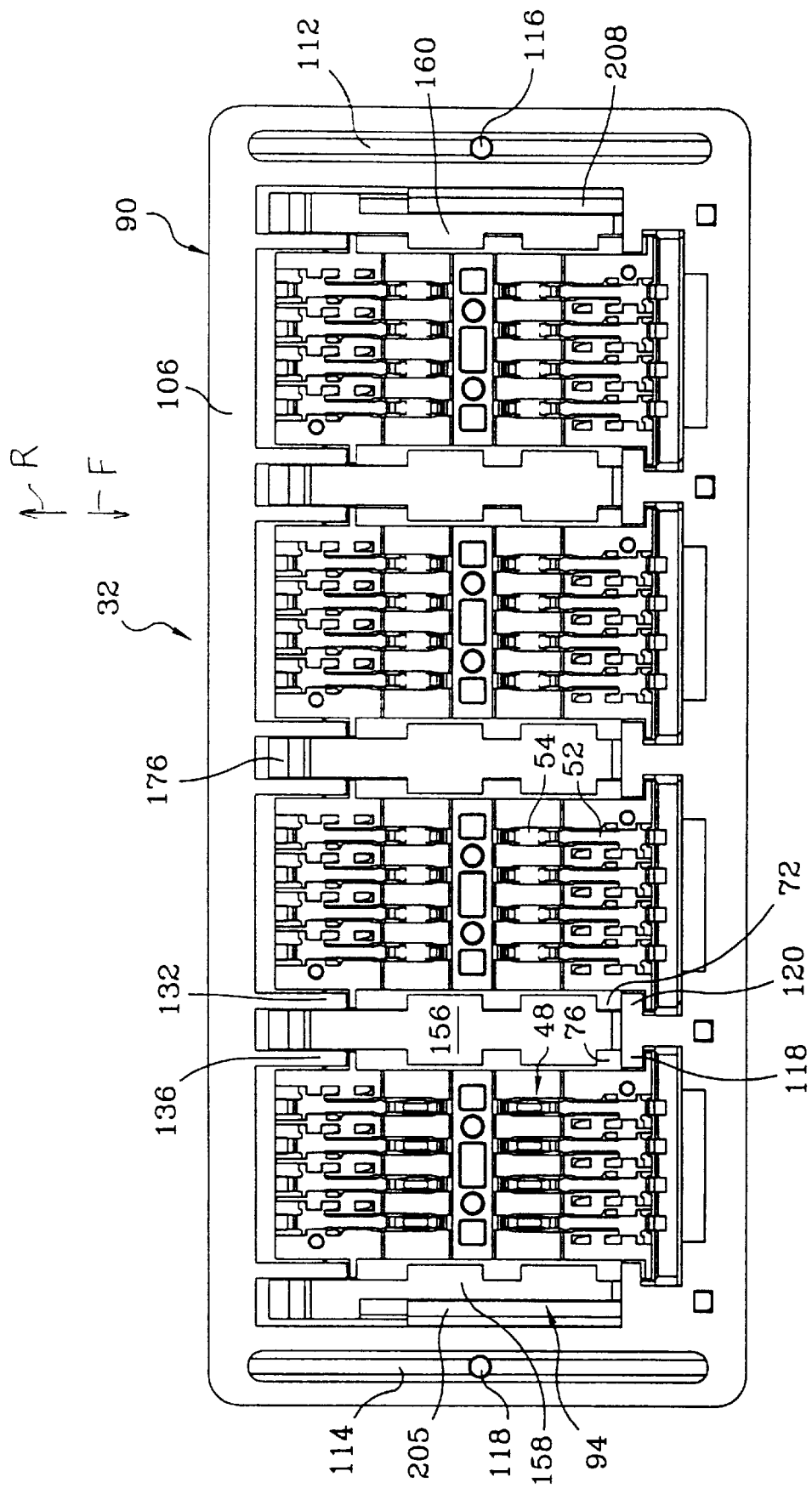

FIG. 28 is a bottom view of the connector of FIG. 27.

Figure 29:
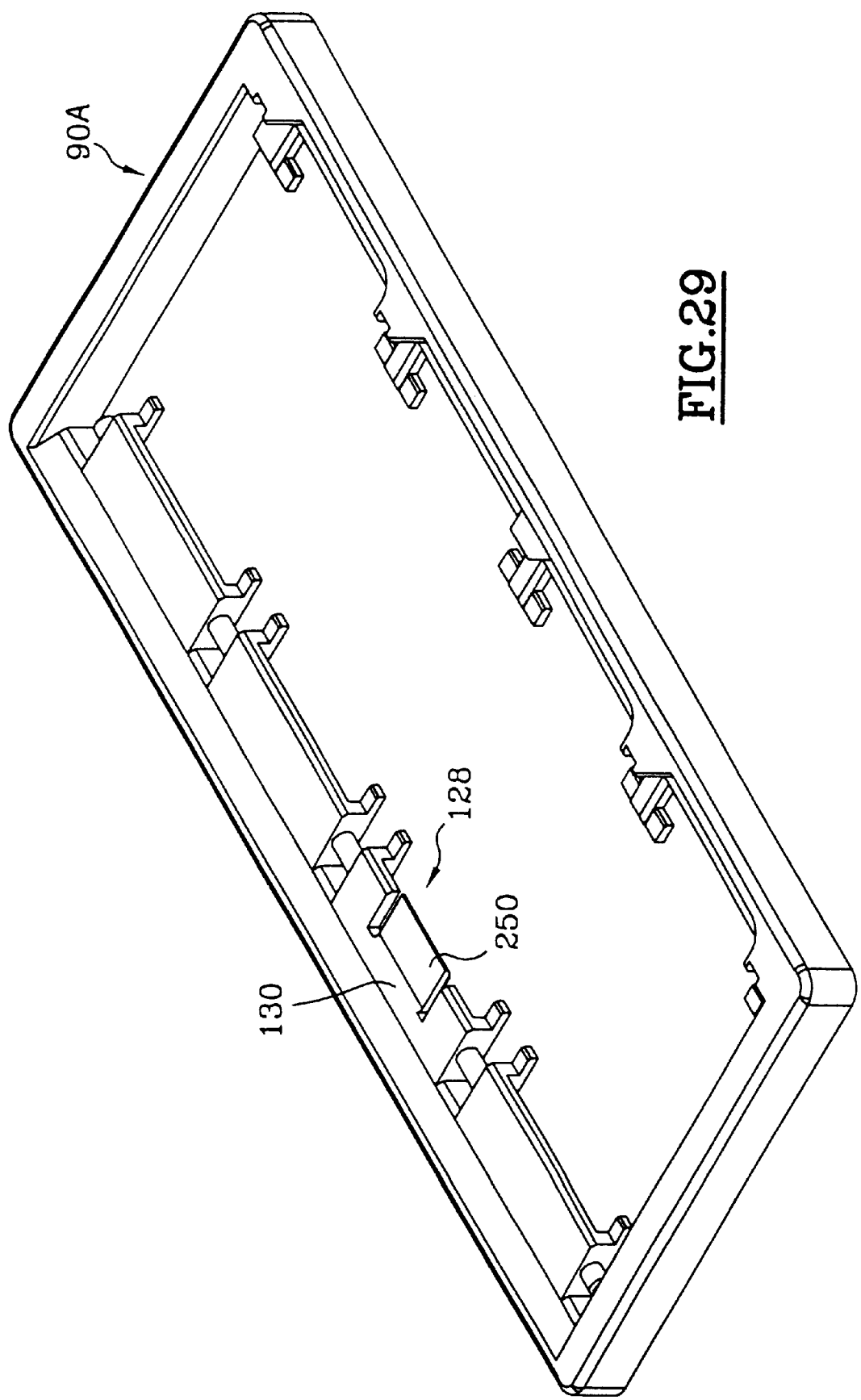
Figure 30:
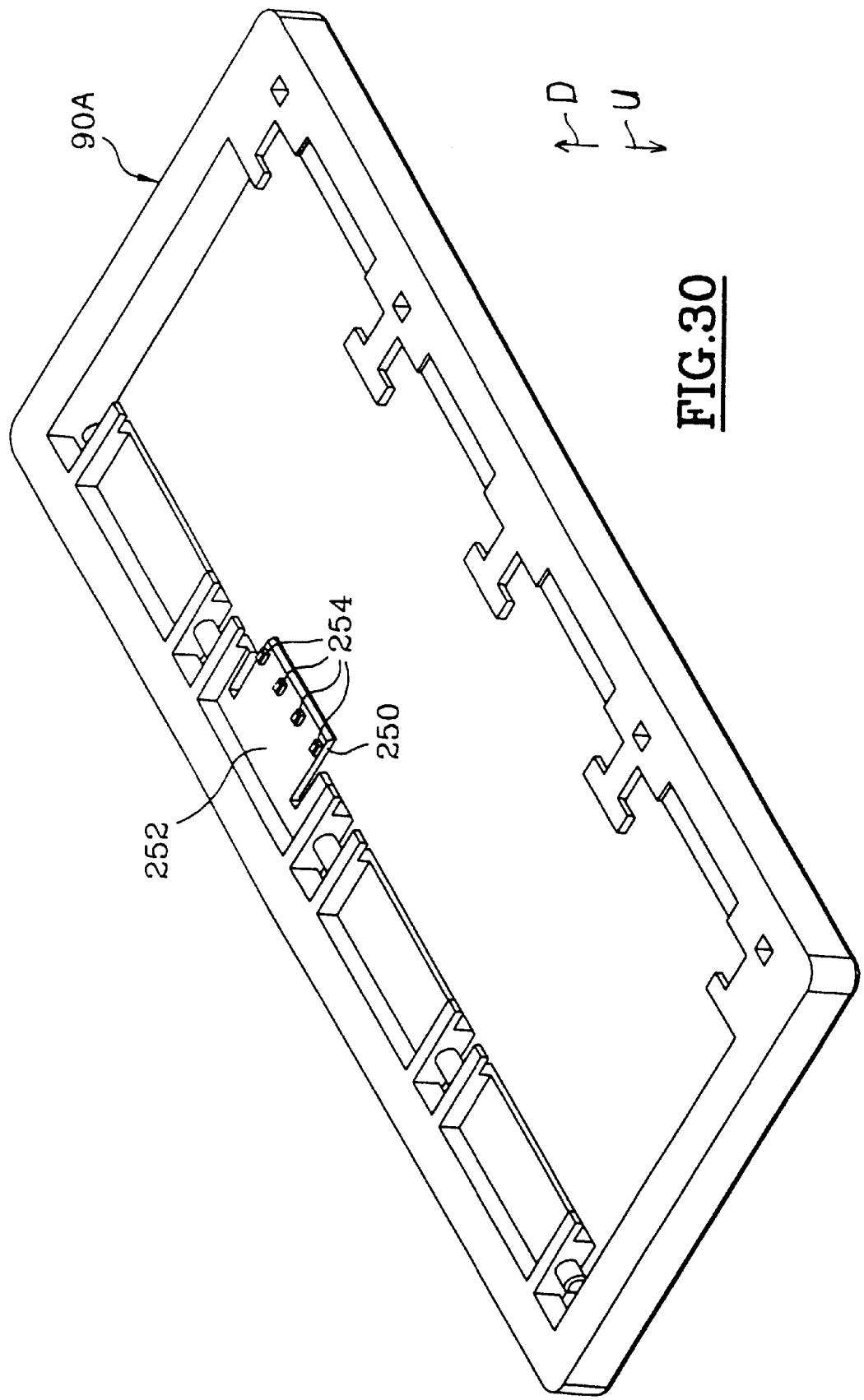

FIGS. 29 and 30 are views similar to those of FIGS. 6 and 8, but which illustrate an alternative embodiment of the frame of the connector.

DETAILED DESCRIPTION OF THE INVENTION

I. Limited Description of the Invention

FIG. 25 illustrates an electrical connector 32 that can receive up to four smart cards C with chip cards being shown. The connector includes a housing 300 comprising a frame 90 and a cover 92 that can pivot about an axis X—X on the frame. The cover is shown in an open position, wherein it can receive up to four smart cards by sliding each smart card in a direction I into one of four corresponding card receivers 162. Four contact assemblies 48 are coupled to the frame 90, with each contact assembly having two rows of contacts. Each contact assembly includes a base 50 with an upper face 56, and each contact has a contacting end 54 that projects above the base upper face to engage corresponding contact pads 36 on a smart card. Such engagement with the smart card pads occurs when the cover 92 with the smart cards therein is pivoted forward F and downward D. When the cover has been pivoted forward and down against the frame 90, a locking member or a latch member 94 is slid forward to lock the cover in its closed position. As shown in FIG. 23, the electrical connector 32 is mounted on the upper face 42 of a circuit board 38, with a combination of electrical connector 32 and circuit board 38 providing an electrical connector system 302.

FIG. 1 shows the circuit board 38 which has two rows of conducting tracks or traces 40 on its upper face for connecting to contacts of the connector assemblies. The traces are arranged in four pairs. The board has a pair of base positioning holes 44 between each pair of traces for positioning the bases of the four contact assemblies on the board. The board also has four frame positioning holes 46 for positioning the frame on the board so the frame is precisely positioned with respect to the four contact assemblies.

FIG. 2 shows the four contact assemblies 48 mounted on the circuit board 38. The base 50 of each contact assembly is plate-shaped in that its opposite faces are largely flat. It is noted that the bases 50 each have four tabs or slot walls 72, 74, 76, 78 which form slots 304 between each slot wall and the board 38, with each slot opening in a rearward direction R. The slots are useful for mounting the frame to the bases 50 of the four contact assemblies.

FIG. 6 shows that the frame 90 which mounts on the circuit board around the four contact assemblies, has four receptacles 128 for receiving the bases of the four contact assemblies. The frame has a rear 310 with a rear cross member 102 that extends in a lateral direction L, which is sometimes referred to herein as a transverse direction. The frame also has a front cross member 100 and a pair of side beams or uprights 96, 98 that connect the front and rear cross members. A pair of rear lugs 136, 138 at the rear of the frame, and a pair of front lugs 118, 120 at the front of the frame are designed to slide forwardly F into the rearwardly opening slots 304 (FIG. 2) on the bases 50 of the four contact assemblies 48. Thus, after the four contact assemblies 48 have been fixed to the circuit board, the frame 90 (FIG. 6) is positioned slightly rearward of its final position and is slid forward, with the four lugs 118, 120, 136, 138 at each receptacle sliding into the four slots formed by the bases of the four contact assemblies.

FIG. 5 shows that each of the bases 50 have a pair of studs 66 that are inserted into the positioning holes 44 (FIG. 1) of the circuit board to fix the position of each base on the circuit board. The contacts 52 of each contact assembly have tails 58 that are soldered to the traces 40 on the circuit board. It is noted that the contact tails can be joined to the circuit board traces by brazing, conductive paste, etc. which are all the equivalent of soldering.

FIG. 8 which is an upside-down view of the frame 90, shows that the frame has a pair of studs 116, 118 that are inserted into the frame-positioning holes 46 (FIG. 1) of the circuit board. Since the studs, 118, 120, 136, 138 slide along the upper surface of the circuit board to slide into the slots formed on the base of the four contact assemblies, the studs 116, 118 could be a problem to initial installation of the frame on the contact assemblies and circuit board. Applicant mounts the studs 116, 118 on beams 112, 114 that can easily deflect. As shown in FIG. 27, each beam such as 112 is separated from an upright 98 at the side of the frame so the beam can deflect and allow the stud 116 to deflect. Accordingly, during installation of the frame on the base, the beams 112, 114 (FIG. 8) allow the studs 116, 118 to deflect upwardly until the studs reach the frame-positioning holes 46 (FIG. 1) in the circuit board, when they press into the holes.

FIG. 6 shows that the frame rear 310 has five pin portions 140 of cylindrical shape. The pin portions are used to pivotally support the cover on the frame. FIG. 11, which is an upside-down view of the cover 92, shows that the cover has three central bearings or arms 176 and two end arms 178, with each arm having a slot 312. As shown in FIG. 13, the cover 92 is placed in an orientation where the slots or openings of the arms 176, 178, 180 face largely rearwardly and downward. The bottom of the cover is then pushed rearwardly so the slots in the arms such as 176 snap into the corresponding pin portions 140 (FIG. 6) of the frame.

The four card receivers 162 (FIG. 11) of the cover 92 are formed between four beams or uprights, including three center uprights 156 and two end uprights 158, 160. The uprights form edge guides at 164 that slidably guide the opposite edges of the smart card in sliding downwardly (in FIG. 25) until the leading edge 154 of the smart card engages a stop 152 on the cover.

Each smart card of the type illustrated in FIG. 25 has a cut corner face 240. The front end of the frame 90 has a corresponding barrier 231 for each card position, to prevent the cover from closing if the card is not fully installed. FIG. 26 shows a card fully installed so its cut corner face does not provide interference against the barrier 231.

The latch 94, which can lock the cover in its downward position, is formed from a single piece of sheet metal. As shown in FIG. 15, the latch 94 has a pair of opposite sides at 198, 200 that are slidable engaged with the end uprights 158, 160 (FIG. 11) of the cover. The latch 94 (FIG. 15) has a plurality of locking tabs 228 which extend downwardly D and forwardly F from a front lateral or transverse edge 190 of the latch. Referring to FIG. 19B, it can be seen that the frame 90 has a plurality of extensions 230 which form the top of rearwardly-opening strike slots 231 between the wall 230 and the circuit board. When the latch 94 is slid forward F, the locking tabs 228 move under the slot walls 230 to prevent the cover from pivoting up until the latch is slid rearward. FIG. 19A shows the latch 94 slid forward so the bottom of its locking tabs 228 lie under the slot walls. An arrow marked on the upper surface of the latch 94 indicates to the person that the latch should be slid forward or rearward to lock and release it.

FIG. 2 shows that each of the four contact assemblies 48 includes a onepiece molded base 50, with eight contacts mounted on the base, with FIG. 5 showing details of the base. The frame 90 shown in FIG. 6 is a one-piece molded item, as is the cover 92 shown in FIGS. 10–14. Both the frame and cover are of relatively complex design, but when large numbers are formed by injection molding the cost of each is moderate. The latch is formed from a single bent piece of sheet metal. Thus, the connector assembly for receiving and engaging the contact pads of a plurality of smart cards simultaneously, is of relatively simple design as compared to providing perhaps four separate connectors. It is noted that the circuit board has conductive trace lines (not shown) that enable signals on the eight traces for each smart card to be separately processed and transmitted over transmission lines to separate stations.

II. Detailed Description of the Invention

FIG. 25 shows an electrical connector 32 for connection of up to four cards C, each of which is a compact-type smart card. The lower face 34 of each card has parallel electrical connection pads 36 oriented longitudinally, that is to say, parallel to the direction I of insertion of each card C into the connector 32. The connector 32 is designed to be incorporated into a device or terminal comprising a lower circuit board 38 (FIG. 1) to which the connector 32 is fixed.

In a simplified representation of the board 38 in FIG. 1, it may be seen that the board has four identical groups of eight conducting tracks 40 arranged on the upper face 42 of the board 38 and transversely or laterally L spaced apart. Each group of tracks 40 is associated with one pair of positioning holes 44. On each side of the four groups, the board 38 also has two transversely opposed frame positioning holes 46.

FIG. 2 shows that the board 38 is designed to accommodate, on its upper face 42, four independent and identical contact assemblies 48. Each contact assembly 48 includes a generally plate-shaped base 50 made of an insulating plastic. As shown in FIG. 4, each base 50 serves as a support for a series of electrical contacts 52 made of a conducting material. Each contact is elongated in the longitudinal direction M and is inserted into the base 50. Each contact 52 has a curved contacting end 54 that projects vertically above the plane horizontal upper face 56 of the base 50. This allows the contacting end to come into contact with a corresponding pad 36 (FIG. 25) on a card C when the latter is in the connection position.

Each contact 52 (FIG. 4) has a termination end 58 that extends longitudinally beyond the front or rear transverse edge 60, 62 of the body 50. The termination end is connected by soldering or brazing to a corresponding conducting track 40 (FIG. 1) on the circuit board, against the upper face 42 on which the body 50 (FIG. 4) rests. The body has a lower face 64 (FIG. 5) that lies against the board. The lower face 64 has a pair of cylindrical studs 66 at diagonally opposite ends for positioning the body 50 on the face 42 (FIG. 1) of the circuit board. The studs project downwardly from the lower face and are received in the holes 44 in the board 38. Each body 50 has opposite vertically and longitudinally-extending sides or edges 68, 70.

Each side 68, 70 of the base has two horizontal tabs 72, 74 and 76, 78 near its front and rear edges 60, 62. The tabs extend transversely L and each is approximately coplanar with the upper face 56 of the body 50. Each tab 72–78 is spaced above the upper face 42 (FIG. 2) of the board 38. Each tab forms an upper slot wall of an opening that is open towards the rear transverse edge 39 of the board 38. To increase the mechanical strength of the tabs 72–78 (FIG. 5), each of them is reinforced by a vertical reinforcing plate 80, 82, 84, 86. The plates bear on the upper face 42 of the circuit board 38 and close the forward ends of the housing at the tabs 72–78.

As shown in FIG. 4, the upper face 56 of the contact-carrying base 50 is flat and clear of projections except for the contacting ends 54 of the contacts 52. The rear end part of the base 50, which extends rearward of the tabs 74 and 78, is generally in the form of part of a plate of rectangular shape. The four contact-carrying bases 50 are identical. After manufacturing these bases separately, each is mounted and fixed to the board 38 in a simple manner, preferably by use of the pick-and-place technique. Apart from the four contact-carrying bases 50, the connector 32 has (FIG. 3) a frame 90 which surrounds the contact assemblies 48 and that carries a hinged upper cover 32 that carries the cards. The cover has a latch member 94 for locking the cover in the closed position. As shown in FIG. 6, the frame 90 is a one-piece molded plastic part that includes a pair of parallel end uprights 96, 98. The end uprights are joined together at their front and rear ends, by front and rear cross-members 100, 102. The uprights 96, 98 and the cross-members 100, 102 have the same thickness, which forms the thickness of the frame 90. This thickness is the distance separating the planar upper face 104 of the frame from its planar lower face 106 that is designed to bear against the upper face of the circuit board. The two end uprights 96, 98 have the same design, with each having a central recess 108, 110. The bottom of the recesses 108, 110 form two thin beams 112, 114 (FIG. 8) that are each capable of elastically bending up and down. The center of each beam carries a cylindrical stud 116, 118 for positioning the frame 90 with respect to the face 42 (FIG. 1) of the circuit board 38, with each stud being designed to be inserted into one of the holes 46 in the board.

When the beams 112, 114 (FIG. 8) are not deflected, the studs 116, 118 project vertically beyond the lower face 106 of the frame. The studs can be retracted by elastic deformation of the beams into the recesses 108, 110 (FIG. 6) to allow the frame to be mounted on the board.

FIG. 8 shows that at the lower face 106 of the frame, the front cross-member 100 has four pairs of lugs 118, 120. Each lug is in the form of a shoe of reduced thickness, with the lower face of each lug being coplanar with the lower face 106 of the front cross-member 100. The lugs or shoes 118, 120 lie inside the frame 90 and are joined by connecting tabs 122 (FIG. 6) to the front cross-member 100. Each pair of lugs 118, 120 are laterally separated from each other. The lugs or shoes are capable of being slid under a pair of retention tabs 72, 76 (FIG. 4) of the bases 50. The arrangement of the lugs 118, 120 is complementary to the arrangement and dimensions of the tabs 72, 76 (FIG. 4) of the bases 50 as well as to the arrangement of the four bases on the circuit board 40.

As shown in FIG. 7B, the front upper edges 119, 121 of the lugs 118, 120 are chamfered to make it easy for the lugs to slide underneath the tabs in the bases. Similarly, the rear edges 73, 77 (FIG. 4) of the tabs 72, 76 are chamfered. The rear cross-member 102 (FIG. 6) of the frame 90 has four receptacles 128, of regular parallelepiped shape, each of which is able to accommodate the corresponding rear part 88 (FIG. 4) of rectangular section of the base 50. For this purpose, each receptacle 128 (FIG. 6) is bounded at the top by a horizontal roof 130 which extends forward from the rear cross-member 102 and which lies below the upper face 104 of the frame 90.

Each receptacle 128 is bounded at its laterally opposite sides by a pair of lateral cheeks 132, 134. These cheeks or walls have lower surfaces coplanar with the lower face of the frame. Each of the cheeks 132, 134 has a pair of forwardly-extending shoe-shaped lugs 136, 138. The lugs have a reduced thickness and have lower faces lying adjacent to the upper face of the circuit board. Each receptacle 128 is thus associated with a pair of rear lugs 136, 138 that are each designed to be slid under a retention tab 74, 78 (FIG. 4) of the four bases. Chambered edges 137, 139 (FIG. 7) of the lugs 136, 138 and chambered edges 75, 79 (FIGS. 4 and 5) of the tabs, facilitate forward insertion of the lugs beneath the tabs.

The frame 90 (FIG. 6) has four pairs of lugs (118, 120, 136, 138) for each reception area 128. The lugs can be slid beneath tabs 72–78 (FIG. 4) of the base 50.

The frame 90 (FIG. 6) has pin portions 140 extending laterally between and from the cheeks 132, 134. The pin portions have a common axis X—X (FIG. 7A). The cover 92 (FIG. 25) is hinged to the chassis 90 about the axis X—X. The axis lies near the rear end of the cover 92, and of the frame 90, as well as near the rear ends 88 (FIG. 4) of the contact-carrying bases 50. The cylindrical pin portions 140 (FIG. 6) are engaged with bearings 176 (FIG. 13) of the hinge of the cover 92. The cover is an element of generally rectangular shape. It includes a rectangular upper plate 142 (FIG. 10) having a flat upper face 144 and a flat lower face 146 (FIG. 11). The plate is reinforced at its rear edge by a rear cross-member 148. The rear cross-member has a portion 150 which projects vertically downward D, beyond the lower face 146 of the plate, so the front end transverse face 152 of the portion 150 forms a longitudinal stop for insertion of the cards C. The stop 152 is able to engage the corresponding front transverse edges 154 (FIG. 25) of the cards C.

The cover plate lower face 146 (FIG. 11) has three longitudinally-extending parallel central uprights 146 and two end uprights 158, 160. The end uprights are of reduced width. The central and end uprights have internal faces 157, 159, 161 that form the edges of guideways for cards that are received in the receptacle parts 162. The edges of each receptacle part 162 have guides 164 that form horizontal slideways 166 that guide the cards to their full insertion positions. The distance between the upper and lower faces of the slide ways 166 is slightly greater than the thickness of the cards so the pair of slideways form panels for receiving cards.

To make it easier to install a card C (FIG. 25) in its receptacle 162 of the cover, each receptacle is partially opened at its front end. That is, the plate 142 (FIG. 10) has four cut-aways 170 that are each in line with a receptacle 162. Apart from the fact that the cut-aways make it easier to insert and extract the cards, each cut-away exposes a surface plane P on which the card rests. The plane forms an upper face 162 on a transverse bar 174 which is co-planner with the upper face 164 (FIG. 11) of the slideways 166.

Each bar 174 (FIG. 10) joins two adjacent uprights 156, or joins a central upright to an adjacent end upright 158, 160. As shown in FIG. 11, each upright forms a bearing, including center bearings 176 and end bearings 178, 180. Each bearing extends rearward of the cross member 148. Each bearing has a radially-opening cylindrical recess, as shown in FIG. 12. The recess allows the pin portions 140 (FIG. 9A) of a frame to be mounted in the bearings by resiliently snapping the bearings around the pin portions. This arrangement has several advantages. By molding the pin portions 140 (FIG. 8) integrally with the rest of the frame 90, the pin portions are easily reinforced by the rest of the frame, especially by joining together certain of the cheeks 136, 138. The orientation of the slots 312 and the bearing makes it possible to remove the cover when the cover is in an approximately vertical orientation (FIG. 25), by forcefully pulling the cover forward F without rotating it. The bearings may be damaged during such removal, but this is of no serious consequence because the cover that has been removed can be replaced by another one.

The design of the cover 92 allows the use of a single component comprising four card receivers 166 capable of receiving the four cards C. Each card receiver 162 has a recessed face so the conducting pins 36 on the cards C can come into contact with the free ends 58 of the contacts when the cover is in its closed position. To move the cover to its closed position, the cover is pivoted forward and down, to the position shown in FIG. 3.

FIG. 13 shows a sub assembly that includes the cover 92 pivotedly mounted on the frame 90. Assembly is accomplished by snapping the bearings 176-180 onto the hinge pin portions. The cover carries a latch member 94 that lies primarily above the top of the cover and that locks the cover 92 in a closed position. As shown in FIG. 18, the locking or latch member extends along most of the lateral length of the cover. FIG. 15 shows that the latch member 94 comprises a piece of sheet metal that includes a rectangular plate 184. When mounted on the cover, the plate 184 extends above the upper face 144 (FIG. 10) of the plate 142 of the cover 92. The plate-shaped upper part 184 (FIG. 15) of the latch member 94 is slightly thinner than a thickened part 188 (FIG. 10) of the rear cross member 148 of the cover 92. In the latch 94 (FIG. 15) the central part of the plate 184 may dip down so that its lower face 185 (FIG. 16) frictionally engages the adjacent portion of the upper face 144 (FIG. 10) of the cover plate 142. This forms a brake for the latch member. The latch member (FIG. 16) has two lugs 187 that hold the latch member to the cover. Each lug fits into a groove 189 (FIG. 10) formed in the upper face of the cover 92 that allows the lug to move forward and rearward with the latch member. Each lug 187 may engage the front end of the corresponding groove in order to form a stop that retains the latch member on the cover.

The upper plate 184 (FIG. 15) of the latch member has front and rear transverse edges 190, 192. Each edge has a rounded central cut-away or recess 194, 196. The upper plate 184 has two vertical cheeks 198, 200 that form the bottom of channels. When the latch member is slid onto the cover, the channels extend along transverse faces 202, 204 (FIG. 10) of the end uprights 158, 160 of the cover 92. A pair of guide tabs 206, 208 (FIG. 15) extend from the cheeks to form channels 212 that guide the latch member in longitudinal sliding along the end uprights 158, 160 (FIG. 11) of the cover.

Thus, the latch member 94 (FIG. 15) can slide in forward and rearward directions F, R between locked and unlocked positions. In an unlocked rear position, rear-end edges 220, 222 (FIG. 16) of the cheeks and tabs lie against corresponding vertical shoulders 224, 226 (FIG. 11) on the cover. In a locked front extreme position, the latch member engages the frame to prevent pivoting of the cover.

The latch 94 (FIG. 15) has four locking tabs 228 that extend forward from the front transverse edge 190 of the plate 184. Each of the locking tabs 228 extends downward and forward, so a bottom 229 of the locking tab can slide under an extension 230 (FIGS. 6 and 7B) that is integrally molded with the front cross-member 100 of the frame 90. Each extension 230 has a plate shape and extends rearward of the front cross beam, in the plane of the upper face 104 of the frame. Each extension has a rear edge 232 and a notch 234 that allows passage of the connection elbows of the locking tabs 228 during locking movement.

As shown in FIGS. 19A and 19B, the front free end of each locking tab 228 extends beneath the plate portion 230 when the locking member 98 is slid forward to its locked position. The cover 92 (FIG. 19B) has four recesses 234 that each receives a tab 228 of the locking member. This allows the cover 92 to close so the locking member 94 can then slide into the recesses 234 and under the extensions 230.

The illustrated cards C (FIG. 25) are of the "MICRO-SIM" type, with a rear transverse edge 155 that has a cut corner edge 240. A cut corner edge 240 lies at the plate portion 230 (FIG. 26). Edges 231 of the plate portions 230 prevent the cover from closing completely if one of the cards is not fully inserted into the cover.

To assemble the connector assembly, the bases with contacts mounted thereon are placed on the circuit board, with tails of the contacts soldered to traces on the circuit board. The frame and cover are each molded, and the latch member is attached to the cover. The cover is assembled to the frame by snapping the bearing arms at the rear of the cover onto the pin portions at the rear of the frame. The assembled frame and cover shown in FIG. 21 is laid vertically onto the circuit board 38 until the lower face 106 of the frame lies against the upper face 42 of the board. Then, the frame and cover assembly are slid forward along the upper face of the circuit board, to allow the lugs (118, 120, 136, 138 in FIG. 6) on the frame to slide under the retention tabs (72–78 in FIG. 4) on the four bases. Sliding of the frame with the cover thereon ends when the indexing studs (116, 118 in FIG. 8) automatically drop into the holes in the circuit board under the force of the elastic beams on which the studs are mounted. During sliding of the frame, the roofs 130 (FIG. 6) of the frame slide over rear ends 88 (FIG. 4) of the bases. Also, the contact-carrying bases 48 enter the corresponding receptacles 128 (FIG. 6) of the frame.

The design of the present connector assembly makes it possible to insert several cards C at the same time and to bring them into the contact position, and to lock the assembly, in a single operation. The four contact assemblies 48 are small, independent and identical parts which can be easily mounted and reflow soldered with other components on the circuit board. The frame with the cover thereon is joined at a later stage to the circuit board. The number of parts of the connector is relatively small.

Apart from the bases, the other plastic parts are not exposed to the considerable heat shock resulting from reflow soldering operations. Thus, the frame and cover can be made of less expensive materials that may not withstand the temperatures for reflow soldering.

FIG. 29 shows another embodiment of the invention, where the frame 90A has a locking tab 250. The upside-down view of FIG. 30 shows that the locking tab has projections 254. These projections fit into complementary holes 256 (FIG. 4) in the upper face of the rear-end part 88 of the face 50 of a contact assembly. This embodiment can be used with bases that are positioned on the board 38 automatically by capillary effect during reflow soldering, so there is no need to form holes in a printed circuit board. The lack of holes in the circuit board allows more room for electronic components to be surface-mounted. This design also reduces the lateral width of the frame because of the simplified design of the uprights.

In another embodiment of the invention, not illustrated, elastically deformable means may be provided to automatically return the cover to its open position when not locked. It is also possible to provide openings in the latch member 94 (FIG. 15) and in the upper plate of the cover, with the openings lying in line with the contacting ends 54 (FIG. 4) of the contacts. This facilitates testing of the equipment without the cards. It is also possible to provide catches-and-notches to couple the latch member and cover in order to lock the latch member in its two extreme positions. It is usually desirable to provide a switch on the cover for detecting the presence of a card.

A multi-card connector of the present invention can be used for terminals to decode several television broadcasting signals requiring payment in order to access the corresponding programs. Integration of several points of access in the same terminal for many applications, is thus facilitated for users, who may simply incorporate the corresponding subscriber cards in terminals equipped with a connector whenever the customer subscribes to a service.

Although terms such as "horizontal", "upper", "lower", have been used to describe the invention as illustrated, the connector system can be used in any orientation.

What is claimed is:

1. An electrical connector system for connecting to contact pads on lower faces of smart cards, comprising:

a circuit board that has a plurality of traces;

a plurality of laterally spaced bases that lie on said circuit board, with each base being largely plate-shaped and having an upper face for lying against one of said smart cards;

at least one row of contacts mounted on each of said bases, with each contact having a tail joined to one of said traces and having a contacting part that projects above the upper face of the corresponding base;

a housing that lies on said circuit board around said bases and that is coupled to said bases, said housing having a plurality of longitudinally-extending guides for slidably receiving each of a plurality of smart cards to a fully inserted position wherein contact pads of said smart cards can engage said contacting parts of said contacts;

said bases each being fixed in position to said circuit board, and said housing being fixed in position to said circuit board independently of said bases.

2. The connector system described in claim 1 wherein:

said housing includes a frame that is fixed to said circuit board and that is engaged with said bases, with said frame having a rear end, and a cover having a rear end that is pivotally connected to said frame and that forms said plurality of guides for receiving said smart cards.

3. The connector system described in claim 1 wherein:

said housing includes a frame that has a front end that forms a strike comprising at least one slot wall forming a rearwardly-opening slot; and including a latch mounted on said cover with said latch comprising a piece of sheet metal that is slidably mounted on said cover between lock and unlock positions with said piece of sheet metal having at least one tab that is bent to slide under said slot wall when said piece of sheet metal is slid to said lock position.

4. The connector system described in claim 1 wherein:

said circuit board has a plurality of board holes, each of said bases has a plurality of studs projecting into selected ones of said board holes, and said housing has a plurality of studs projecting into selected ones of said board holes.

5. An electrical connector system for connecting to contact pads on lower faces of smart cards, comprising:

a circuit board that has a plurality of conductive traces;

at least two laterally-spaced dielectric largely plate-shaped bases that each has a lower face lying adjacent to said board and an upper face, with each base being independently mounted on said board;

at least two groups of contacts, with each group mounted on a different one of said bases, with each contact having a contacting part projecting above the upper face of the corresponding base for engaging the contact pads of a smart card and with each contact having a tail joined to one of said traces on the circuit board;

a polymer frame that is molded independently of said bases, said frame being coupled to said bases;

a cover that is pivotally connected to said frame, said cover having at least two laterally spaced card receivers that each has guides for receiving one of said smart cards, said cover being pivotally mounted about a laterally-extending axis with respect to said board to move between a raised cover position to receive said smart cards and a lowered position to move said smart cards substantially against said base upper faces to press said card contact pads against said contact contracting parts.

6. The connector system described in claim 5 including:

said circuit board has a plurality of holes, each of said bases has a plurality of studs that project into selected one of said holes, and said frame has a plurality of studs that project into selected ones of said holes.

7. The connector system described in claim 5 wherein:

said frame forms a strike; and including a latch that comprises a piece of sheet metal that is slidably mounted on said cover between lock and unlock positions, with said strike having a strike surface that is spaced from said board and that faces said board, with said piece of sheet metal having at least one tab that is bent to slide under said strike surface when said piece of sheet metal is slid to said lock position.

8. The connector system described in claim 5 wherein:

said cover forms latch guides at laterally opposite sides of said cover for slidably mounting a latch;

said frame has a plurality of rearwardly-opening recesses;

a latch element that includes a piece of sheet metal that has laterally opposite sides that are each bent into a channel that lies closely around one of said latch guides and that has a front end with a plurality of tabs having downwardly-extending parts with lower ends and forward-extending parts extending forwardly from said lower ends into said recesses, with said latch being slideable on said cover.

9. An electrical connector system for connecting to contact pads on lower faces of smart cards, comprising:

a circuit board that has a plurality of traces;

a plurality of laterally spaced bases that lie on said circuit board, with each base being largely plate-shaped and having lower and upper faces;

at least one row of contacts mounted on each of said bases, with each contact having a tail joined to one of said traces and having a contacting part that projects above the upper face of the corresponding base;

a frame that lies on said circuit board and that has longitudinally-spaced front and rear cross beams that lie respectively forward and rearward of said plurality of bases;

a cover that has a rear end pivotally mounted on said rear cross beam between raised and lowered positions, said cover having a plurality of longitudinally-extending guides for slidably receiving each of a plurality of smart cards to a fully inserted position wherein contact pads of said cards engage said contacting parts of said contacts in said lowered position of said cover.

10. The connector system described in claim 9 wherein:

said frame and said cover are each a one piece molded plastic part, with one of them forming a plurality of laterally-spaced pin portions and the other forming a plurality of bearings that each has a slot to allow the bearing to snap around a corresponding pin portion.

11. The electrical connector system described in claim 9 wherein:

said bases each have a plurality of slot walls forming a plurality of horizontally-opening slots extending from said circuit board to the slot wall;

said frame has a plurality of lugs that fit between said board and said slot walls, with said frame being slidable along said circuit board to slide said lugs under said slot walls.

12. An electrical connector system for connecting to contact pads on lower faces of smart cards, comprising:

a circuit board that has a plurality of traces;

at least one largely plate-shaped base that is fixed in position to said circuit board, said base having a lower face lying facewise adjacent to said circuit board and having an opposite upper face;

a plurality of contacts mounted on said base, said contacts each having a tail soldered to said traces and having a contacting part projecting above said base upper face to engage a smart card contact pad;

a housing which includes a frame part mounted on said circuit board and which includes a cover part that has guides that can hold at least one of said smart cards with the contact pads of the smart card engaged with contact-engaging parts of said contacts;

said base has a plurality of slot walls forming a plurality of slots between the circuit board and the slot walls;

said frame part has a surface that can slide on said circuit board and said frame part has a plurality of lugs that can slide into said slots when said frame part slides.

13. The connector system described in claim 12 wherein:

said circuit board has a pair of holes, and said frame part has a pair of lugs that fit into said circuit board holes when said frame part is slid so its lugs slide into said slots.

14. The connector system described in claim 13 wherein:

said frame part has a pair of opposite sides that each form an elongated beam with fixed opposite beam ends and a free beam middle that is free to deflect up and down, with said studs mounted on said beam middles.

15. The connector system described in claim 12 wherein:

said at least one plate-shaped base includes first and second laterally-spaced substantially identical bases with said plurality of contacts including a group of said contacts mounted on each of said bases;

said cover part has a plurality of guides that each holds a different smart card.

16. An electrical connector system for connecting to contact pads on lower faces of smart cards, comprising:

a circuit board that has a plurality of traces;

at least one largely plate-shaped base mounted on said circuit board and having a lower face lying facewise adjacent to said circuit board and having an opposite upper face, said base having a plurality of contacts with tails soldered to said traces and having a contact part projecting above said base upper face to engage a smart card contact pad;

a frame which is mounted on said circuit board;

a cover that is pivotally mounted about a pivot axis on said frame to pivot between open and closed positions, with said cover having guides that can hold at least one of said smart cards with the contact pads of the smart card engaged with said contact-engaging parts of said contacts when the cover is closed;

said base is a on-piece molded plastic part;

said frame is a one-piece molded plastic part.

17. The connector system described in claim 16 wherein:

said frame has a front end having slot walls forming a plurality of rearwardly-opening strike slots; and including a sheet metal latch that is mounted on said cover to slide forward and rearward on the cover with said latch having a front end forming a plurality of tabs that are bent downward and that have forwardly-projecting tab ends that slide into said strike slots when said latch is slid forward.

18. An electrical connector system for connecting to contact pads on lower faces of smart cards, comprising:

a circuit board that has a plurality of traces;

a plurality of laterally spaced bases that lie on said circuit board, with each base being largely plate-shaped and having an upper face for lying against one of said smart cards, with each base forming at least one slot between the base and said board, and with each slot opening in a predetermined horizontal direction when the circuit board lies in a horizontal plane;

at least one row of contacts mounted on each of said bases, with each contact having a tail joined to one of said traces and having a contacting part that projects above the upper face of the corresponding base;

a housing that lies on said circuit board around said bases and that is coupled to said bases, said housing having a plurality of longitudinally-extending guides for slidably receiving each of a plurality of smart cards to a fully inserted position wherein contact pads of said smart cards can engage said contacting parts of said contacts;

said housing has a plurality of lugs that rest on said board and that are slidable into said slots by movement of said housing opposite to said predetermined horizontal direction.

19. The connector system described in claim 18 wherein:

said circuit board has a pair of holes, and said housing has a pair of studs that fit into said circuit board holes when said frame part is slid so its lugs slide into said slots.

20. An electrical connector system for connecting to contact pads on lower faces of smart cards, comprising:

a circuit board that has a plurality of traces;

a plurality of laterally spaced bases that lie on said circuit board, with each base being largely plate-shaped and having an upper face for lying against one of said smart cards;

at least one row of contacts mounted on each of said bases, with each contact having a tail joined to one of said traces and having a contacting part that projects above the upper face of the corresponding base;

a housing that lies on said circuit board around said bases and that is coupled to said bases, said housing having a plurality of longitudinally-extending guides for slidably receiving each of a plurality of smart cards to a fully inserted position wherein contact pads of said smart cards can engage said contacting parts of said contacts;

said housing includes a frame that is fixed to said circuit board and engaged with said bases and that has a rear end, and a cover having a rear end that is pivotally connected to said frame and that forms said plurality of guides for receiving said smart cards;

said frame and said cover are each a one-piece molded plastic part, with a first of said molded plastic parts forming a plurality of laterally-spaced pin portions and with a second of said molded plastic parts forming a plurality of bearings that each has a slot for receiving one of said pin portions.

21. An electrical connector system for connecting to contact pads on lower faces of smart cards, comprising:

a circuit board that has a plurality of conductive traces;

at least two laterally-spaced dielectric largely plate-shaped bases that each has a lower face mounted on said board and an upper face;

at least two groups of contacts, with each group mounted on a different one of said bases, with each contact having a contacting part projecting above the upper face of the corresponding base for engaging the contact pads of a smart card and with each contact having a tail joined to one of said traces on the circuit board;

a cover that has at least two laterally spaced card receivers that each has guides for receiving one of said smart cards, said cover being pivotally mounted about a laterally-extending axis with respect to said board to move between a raised cover position to receive said smart cards and a lowered position to move said smart cards substantially against said base upper faces to press said card contact pads against said contact contracting parts; and a frame that lies around said bases and that is fixed with respect to said board, with said cover being pivotally connected to said frame; and wherein said bases each forms at least one slot between the base and said board with said slots opening in a predetermined horizontal direction;

said frame has a plurality of lugs that rest on said board and that are slidable into said slots by movement of said frame opposite to said predetermined horizontal direction.

\* \* \* \* \*